United States Patent
Tanabe

(10) Patent No.: US 11,054,909 B2
(45) Date of Patent: Jul. 6, 2021

(54) TACTILE SENSE PROVISION APPARATUS AND A CONTROL METHOD

(71) Applicant: MARUWA Corporation, Osaki (JP)

(72) Inventor: Yoshio Tanabe, Osaki (JP)

(73) Assignee: MARUWA Corporation, Osaki (JP)

( * ) Notice: Subject to any disclaimer, the term of this patent is extended or adjusted under 35 U.S.C. 154(b) by 0 days.

(21) Appl. No.: 16/961,539

(22) PCT Filed: Jan. 21, 2019

(86) PCT No.: PCT/JP2019/001717
§ 371 (c)(1),
(2) Date: Jul. 10, 2020

(87) PCT Pub. No.: WO2019/142938
PCT Pub. Date: Jul. 25, 2019

(65) Prior Publication Data
US 2021/0055795 A1  Feb. 25, 2021

(30) Foreign Application Priority Data

Jan. 22, 2018  (JP) .............................. JP2018-008233

(51) Int. Cl.
*G06F 3/01* (2006.01)
*G06F 3/041* (2006.01)
*G06F 3/0488* (2013.01)

(52) U.S. Cl.
CPC .............. *G06F 3/016* (2013.01); *G06F 3/041* (2013.01); *G06F 3/0488* (2013.01)

(58) Field of Classification Search
CPC ......... G06F 3/016; G06F 3/041; G06F 3/0488
See application file for complete search history.

(56) References Cited

U.S. PATENT DOCUMENTS

| 2012/0249459 A1* | 10/2012 | Sashida ................. G06F 1/1626 345/173 |
| 2016/0259414 A1 | 9/2016 | Fujii et al. |
| 2019/0025973 A1* | 1/2019 | Schmitt ............. G01R 31/2829 |

FOREIGN PATENT DOCUMENTS

| JP | 2012-203895 A | 10/2012 |
| JP | 2014-088818 A | 5/2014 |
| JP | 2016-010302 A | 1/2016 |
| JP | 2016-162328 A | 9/2016 |
| WO | WO2016174760 A1 | 11/2016 |

OTHER PUBLICATIONS

English translation of International Search Report for PCT Application No. PCT/JP2019/001717 dated Mar. 12, 2019, 1 page.

* cited by examiner

*Primary Examiner* — Daniell L Negron
(74) *Attorney, Agent, or Firm* — Bret E. Field; Bozicevic, Field & Francis LLP

(57) ABSTRACT

The object is to provide a tactile sense provision apparatus that vibrates the finger or the like of the user through a touch panel to provide the user with a tactile sense when the touch panel is operated.
A tactile sense provision apparatus comprises a transparent plate that covers a touch panel of equipment; an actuator that is fixed to the transparent plate; a reception unit that receives a signal transmitted based on operation through the touch panel; and a control unit that operates the actuator based on a signal received by the reception unit.

4 Claims, 27 Drawing Sheets

F I G. 2 6
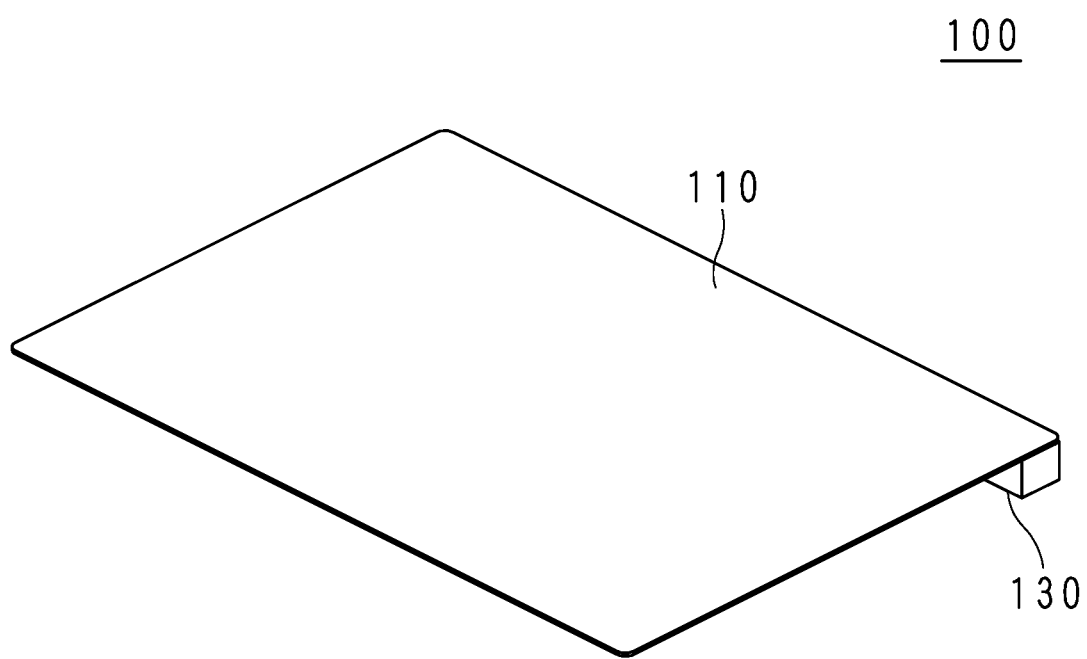

TACTILE SENSE PROVISION APPARATUS AND A CONTROL METHOD

CROSS-REFERENCE TO RELATED APPLICATIONS

This application is the national phase under 35 U. S. C. § 371 of PCT International Application No. PCT/JP2019/001717 which has an International filing date of Jan. 21, 2019, which claims priority under 35 U.S.C. § 119 on Patent Application No. 2018-008233 filed in Japan on Jan. 22, 2018, and designated the United States of America.

FIELD

The present invention relates to a tactile sense provision apparatus and a control method.

BACKGROUND

As an input device for electronic equipment, a touch panel is used that is operated with the touch of a finger on a button or the like displayed on the screen.

In the case where the touch panel is operated, the acceptance of operation can be determined based on the changes of the display on the screen.

A vibration generation apparatus has been proposed that holds the outer case of electronic equipment with a touch panel and appropriately provides the entire electronic equipment with vibrations to thereby allow the user to perceive the sense of operation or the like through the vibrations (Japanese Patent Application Laid-Open No. 2016-162328).

SUMMARY

In the vibration generation apparatus disclosed in Patent Document 1, however, the timings when vibrations are to be provided cannot appropriately be decided.

As one aspect, it is an object of the present invention to provide a tactile sense provision apparatus that vibrates the finger or the like of the user through a touch panel to provide the user with a tactile sense when the touch panel is operated.

A tactile sense provision apparatus comprises: a transparent plate that covers a touch panel of equipment; an actuator that is fixed to the transparent plate; a reception unit that receives a signal transmitted based on operation through the touch panel; and a control unit that operates the actuator based on a signal received by the reception unit.

As one aspect, it is possible to provide a tactile sense provision apparatus that provides the user with a tactile sense by vibrating the finger or the like of the user through a touch panel when the touch panel is operated.

BRIEF DESCRIPTION OF THE DRAWINGS

FIG. 26 is a perspective view of the tactile sense provision apparatus in Embodiment 3.

DETAILED DESCRIPTION

Embodiment 1

Figure 1:
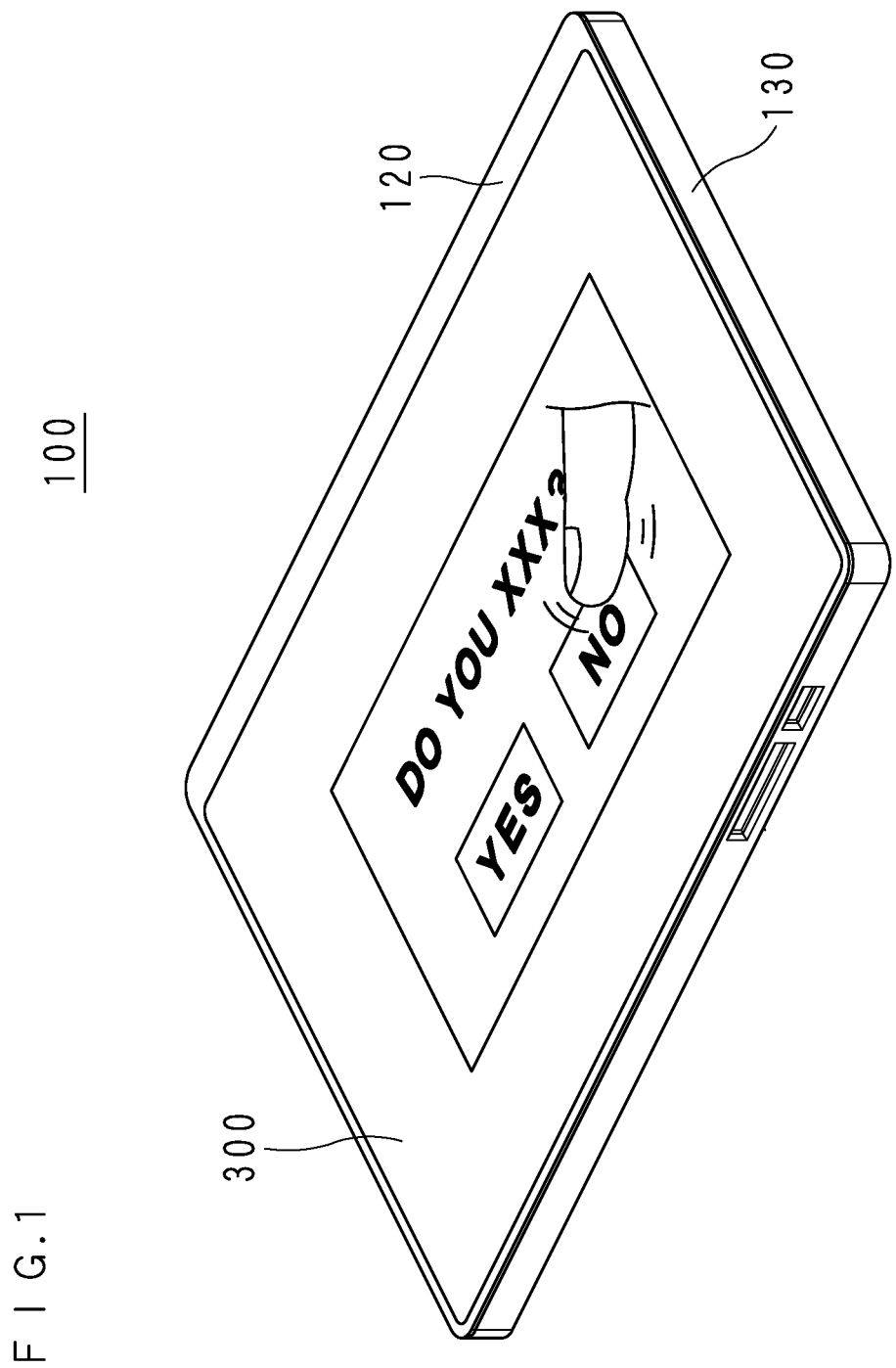
FIG. 1 illustrates the outline of a tactile sense provision apparatus.

FIG. 1 illustrates the outline of a tactile sense provision apparatus. The tactile sense provision apparatus 100 has a transparent plate 110 (see FIG. 2) on one surface thereof and can accommodate a plate-shaped information processing apparatus 300 with a touch panel 376 (see FIG. 5) such as a general-purpose tablet, a smartphone or the like. The information processing apparatus 300 is one example of equipment according to the present embodiment. FIG. 1 illustrates a state where the information processing apparatus 300 is accommodated in the tactile sense provision apparatus 100. The touch panel 376 of the information processing apparatus 300 can be seen through the transparent plate 110.

The user can operate the touch panel 376 with a touch of a finger or the like while viewing the touch panel 376 through the transparent plate 110. As illustrated in FIG. 1, if the user touches a button on the screen displayed on the touch panel 376, and the operation is accepted, the transparent plate 110 is vibrated. This allows the user to sense the acceptance of the operation performed on the touch panel 376 through a tactile sense. By receiving feedback on the acceptance of the operation through the tactile sense, the user can obtain a sense of actually operating a mechanical keyboard or the like.

In other words, the use of the tactile sense provision apparatus 100 can provide the general-purpose information processing apparatus 300 with a tactile feedback function.

Figure 2:
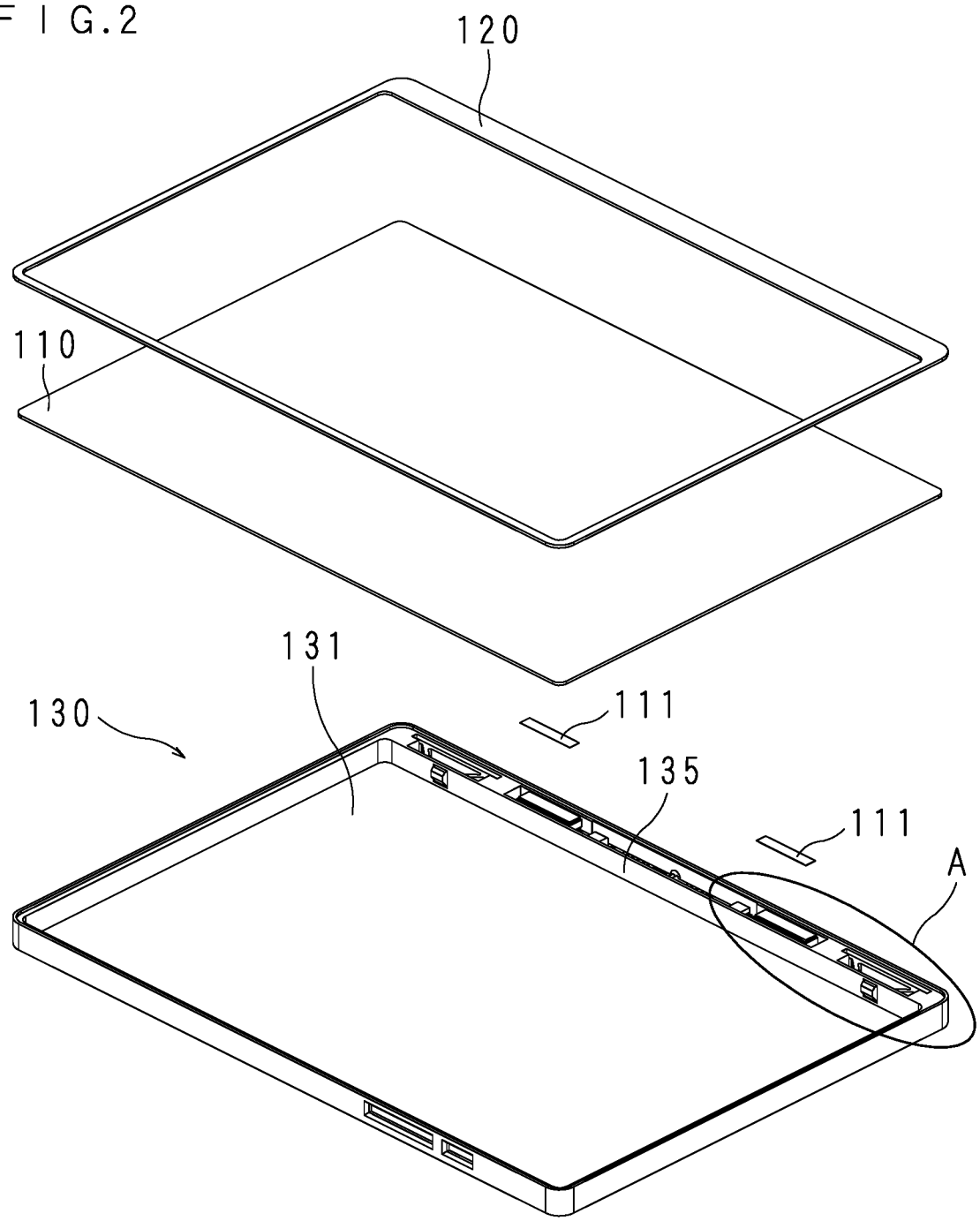
FIG. 2 is an exploded perspective view of the tactile sense provision apparatus.

FIG. 2 is an exploded perspective view of the tactile sense provision apparatus 100. The tactile sense provision apparatus 100 includes a box-shaped casing part 130 that can accommodate the information processing apparatus 300, the transparent plate 110 that covers the touch panel 376 of the information processing apparatus 300 and a front frame 120 that covers the edge of the transparent plate 110.

The transparent plate 110 adheres to the touch panel 376 in a state where the casing part 130 accommodates the information processing apparatus 300. The front frame 120 is fixed at the casing part 130 by a claw or a screw (not illustrated). This allows the user to easily carry and use the tactile sense provision apparatus 100 containing the information processing apparatus 300.

Note that the casing part 130 has a hole at a position corresponding to a connector for use in connecting with a power cable of the information processing apparatus 300, which allows the contained information processing apparatus 300 to be connected to a commercial power.

Figure 3:
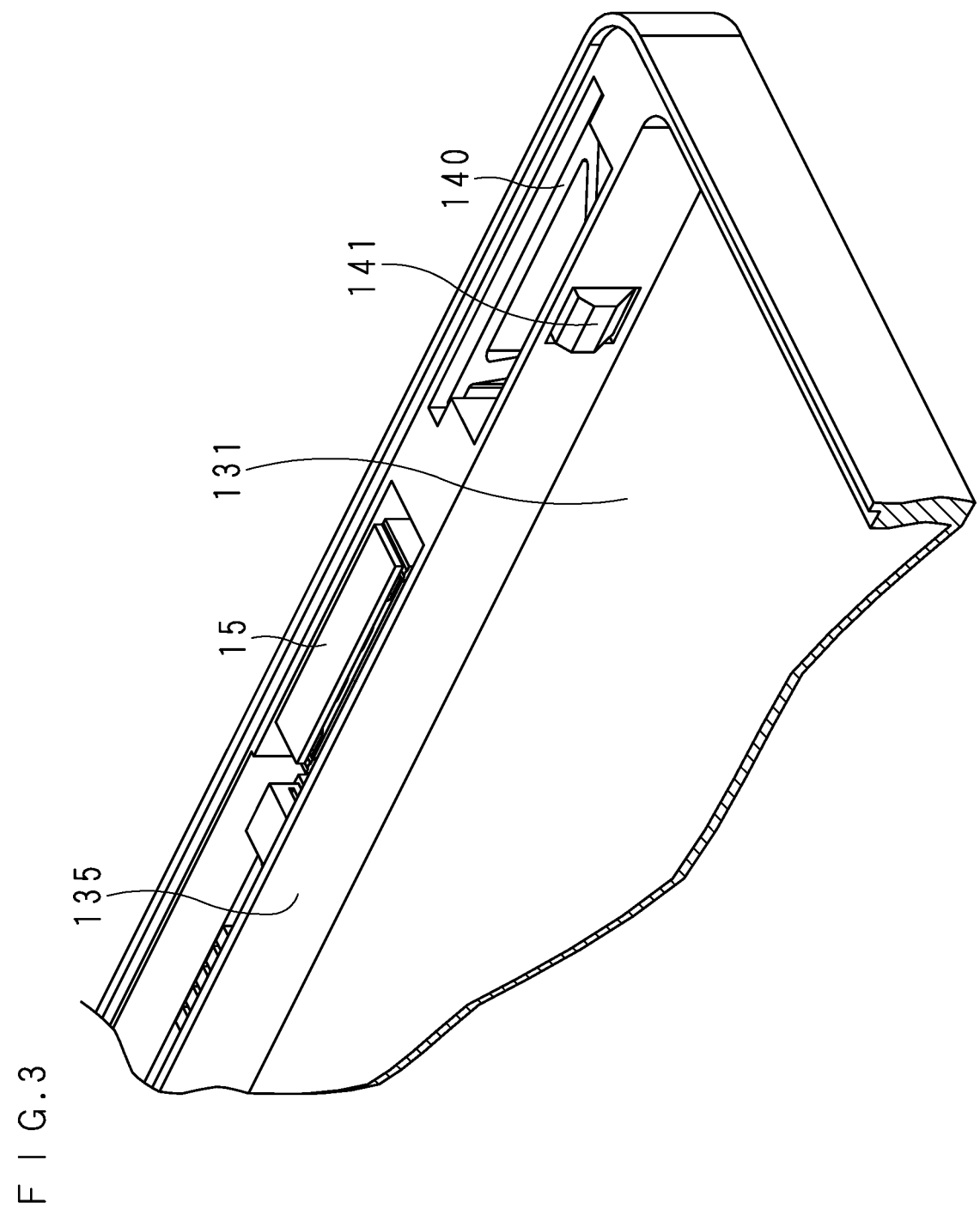
FIG. 3 is an enlarged perspective view of a part A.
Figure 4:
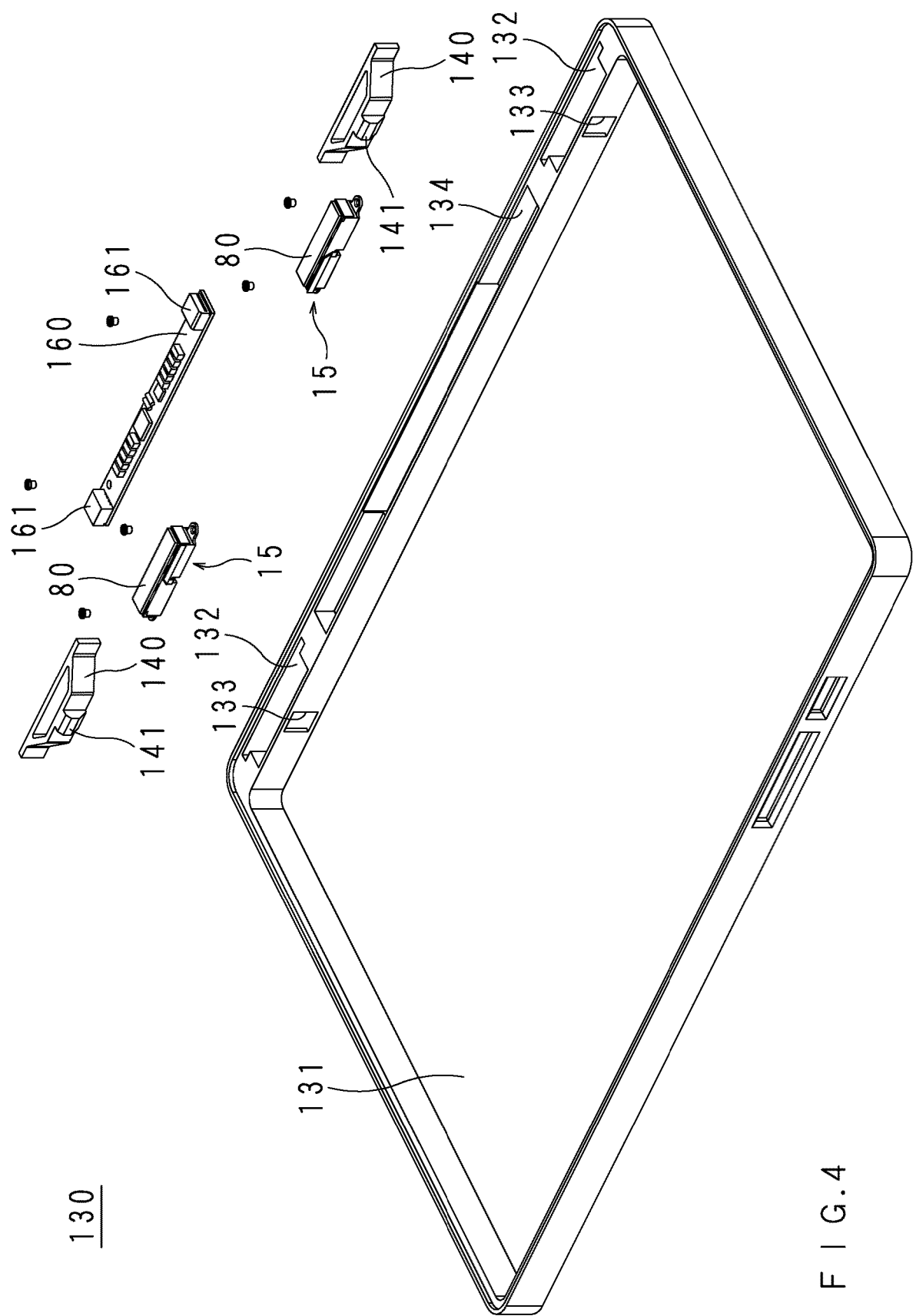
FIG. 4 is an exploded perspective view of a casing part.

FIG. 3 is an enlarged perspective view of a part A. FIG. 4 is an exploded perspective view of the casing part 130. The casing part 130 includes a bottom plate 131. The casing part 130 is divided into an information processing apparatus accommodation part for accommodating the information processing apparatus 300 and a component accommodation part for accommodating the other components by a divisional wall 135 vertical to the bottom plate 131 that extends along one of the long sides of the casing part 130.

At the center of the component accommodation part, an actuator room 134 is provided, and on both sides of the actuator room 134, retention spring rooms 132 are provided. On both sides of the actuator room 134, actuators 15 each having a substantially-rectangular parallelepiped shape are provided such that a second mover 80 that covers one surface of each actuator 15 faces toward the transparent plate 110 side, and each of the actuators is fixed by two screws. The detail of the structure of the actuator 15 will be described later.

Each of the retention spring rooms 132 communicates with the information processing apparatus accommodation part through a quadrilateral retention spring hole 133 provided on the divisional wall 135. In the each of the retention spring rooms 132, a retention spring 140 having an annular trapezoidal cross section is inserted. A retention spring projection 141 projecting from the top plate of the retention spring 140 penetrates the retention spring hole 133 toward the information processing apparatus accommodation part.

The retention spring 140 is made of resin. The retention spring 140 has a function of fixing the information processing apparatus 300 within the casing part 130 by pressing the side surface of the information processing apparatus 300 accommodated in the information processing apparatus accommodation part against the opposing edge of the casing part 130.

At the central part of the actuator room 134, a circuit board 160 having a rectangular plate shape is fixed by two screws. The circuit board 160 is mounted with a control circuit for controlling the actuators 15 while being attached with FPC connectors 161 for connecting the actuators 15 on both ends thereof.

The tactile sense provision apparatus 100 may operate by being supplied with power from the information processing apparatus 300. The tactile sense provision apparatus 100 may operate by a built-in battery (not illustrated). The tactile sense provision apparatus 100 may operate by being supplied with power from a commercial power through a power cable (not illustrated).

It is noted that the bottom plate 131 and the information processing apparatus 300 may be fixed by a double-sided tape of a foaming type when the information processing apparatus 300 is accommodated in the casing part 130. The double-sided tape of a foaming type changes its thickness by being crushed, which can absorb dimensional variations of the information processing apparatus 300 and the tactile sense provision apparatus 100.

Figure 5:
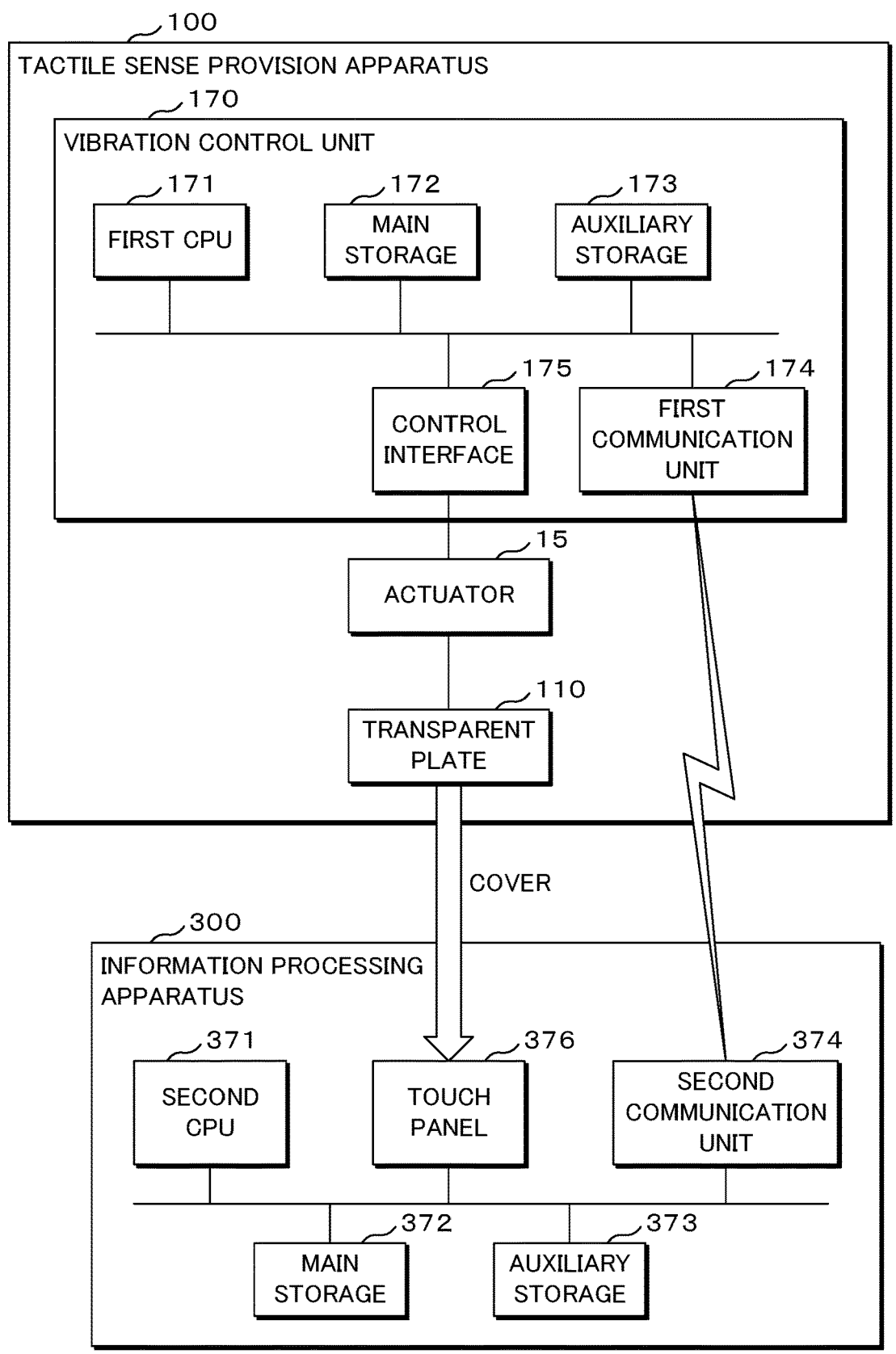
FIG. 5 is a block diagram of a tactile sense provision system.

FIG. 5 is a block diagram of a tactile sense provision system 900. The tactile sense provision system 900 includes the tactile sense provision apparatus 100 and the information processing apparatus 300. The tactile sense provision apparatus 100 includes a vibration control unit 170 mounted on the circuit board 160 as well as the actuators 15 and the transparent plate 110 described above.

The vibration control unit 170 includes a first central processing unit (CPU) 171, a main storage 172, an auxiliary storage 173, a first communication unit 174, a control interface (I/F) 175 and buses.

The first CPU 171 is an arithmetic and control unit that executes programs according to the present embodiment. One or more CPUs, a multi-core CPU or the like are used for the first CPU 171. The first CPU 171 is connected to the hardware elements forming the vibration control unit 170 through the busses.

The main storage 172 is a memory such as a static random access memory (SRAM), a dynamic random access memory (DRAM), a flash memory or the like. In the main storage 172, information necessary in the middle of the processing performed by the first CPU 171 and a program that is being executed by the first CPU 171 are temporarily stored.

The auxiliary storage 173 is a memory such as an SRAM, a flash memory or the like. In the auxiliary storage 173, programs to be executed by the first CPU 171 and various information necessary for execution of the programs are stored.

The first communication unit 174 is a communication I/F for communicating with the information processing apparatus 300. The first communication unit 174 communicates with the information processing apparatus 300 according to any system such as the Bluetooth (registered trademark), an infrared communication, a wireless local area network (LAN) or the like. The first communication unit 174 may communicate with the information processing apparatus 300 by a wired connection using a universal serial bus (USB) cable or the like.

The control I/F 175 is an I/F for connecting the actuator 15 and the vibration control unit 170. The control I/F 175 applies pulse voltage to the actuator 15 based on the control by the first CPU 171.

The vibration control unit 170 may be composed of an integrated circuit (IC) for use in controlling an analogue device and an IC for communication in combination.

The information processing apparatus 300 includes a second CPU 371, a main storage 372, an auxiliary storage 373, a second communication unit 374, the touch panel 376 and busses.

The second CPU 371 is an arithmetic and control unit that executes programs according to the present embodiment. One or more CPUs, a multi-core CPU or the like are used for the second CPU 371. The second CPU 371 is connected to the hardware elements forming the information processing apparatus 300 through the busses.

The main storage 372 is a memory such as an SRAM, a DRAM, a flash memory or the like. In the main storage 372, information necessary in the middle of the processing performed by the second CPU 371 is stored as well as a program that is being executed by the second CPU 371.

The auxiliary storage 373 is a memory such as an SRAM, a flash memory, a hard disk or the like. In the auxiliary storage 373, programs to be executed by the second CPU 371 and various information necessary for execution of the programs are stored.

The second communication unit 374 is a communication I/F for communicating with the vibration control unit 170. The touch panel 376 serves both as an input device and a display device for the information processing apparatus 300.

Figure 6:
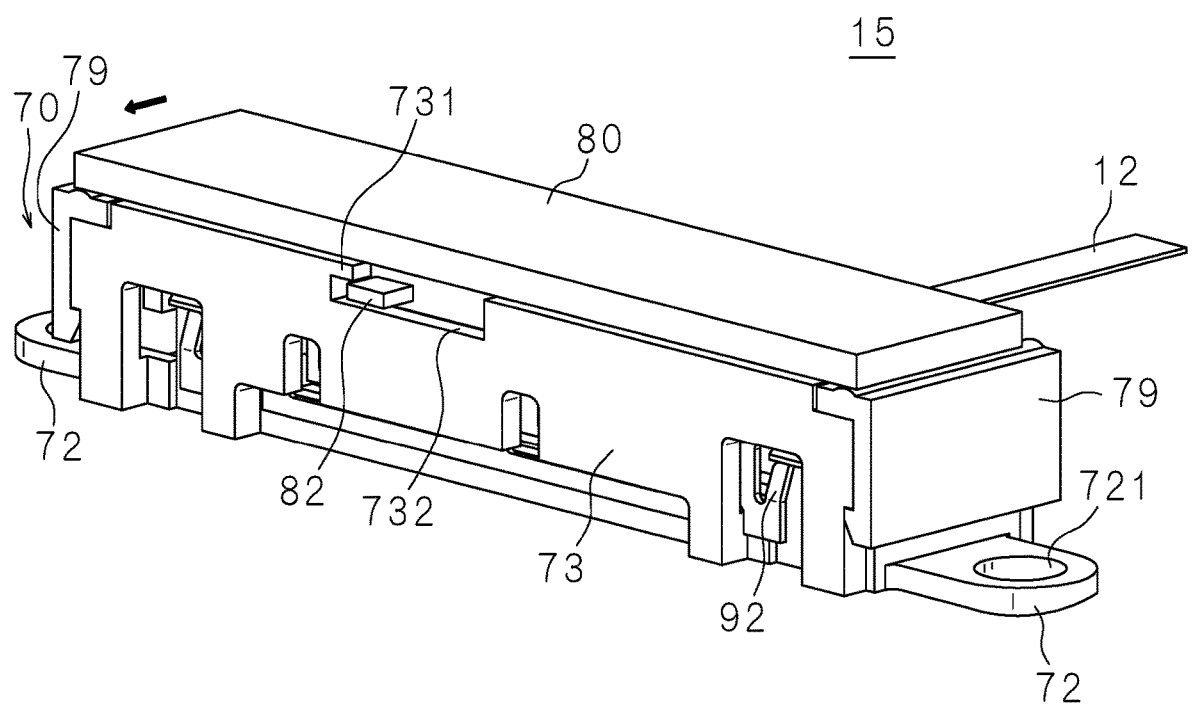
FIG. 6 is a perspective view of an actuator.

FIG. 6 is a perspective view of the actuator. The actuator 15 includes a second stator 70 having a substantially rectangular box shape and a second mover 80 covering an opening of the second stator 70, and has a substantially rectangular parallelepiped shape as a whole.

The actuator 15 is connected to a flexible printed circuits (FPC) 12. By application of pulse voltage to the actuator 15 through the FPC 12, the second mover 80 instantly moves in an in-plane direction indicated by the bold arrow in FIG. 6 and returns to the original state immediately. The actuator 15 instantly moves the transparent plate 110 in the direction parallel to the plane direction in accordance with the instant movement of the second mover 80. The instant movement of the transparent plate 110 allows the user who is operating the touch panel 376 to have a click feeling or the like.

Figure 7:
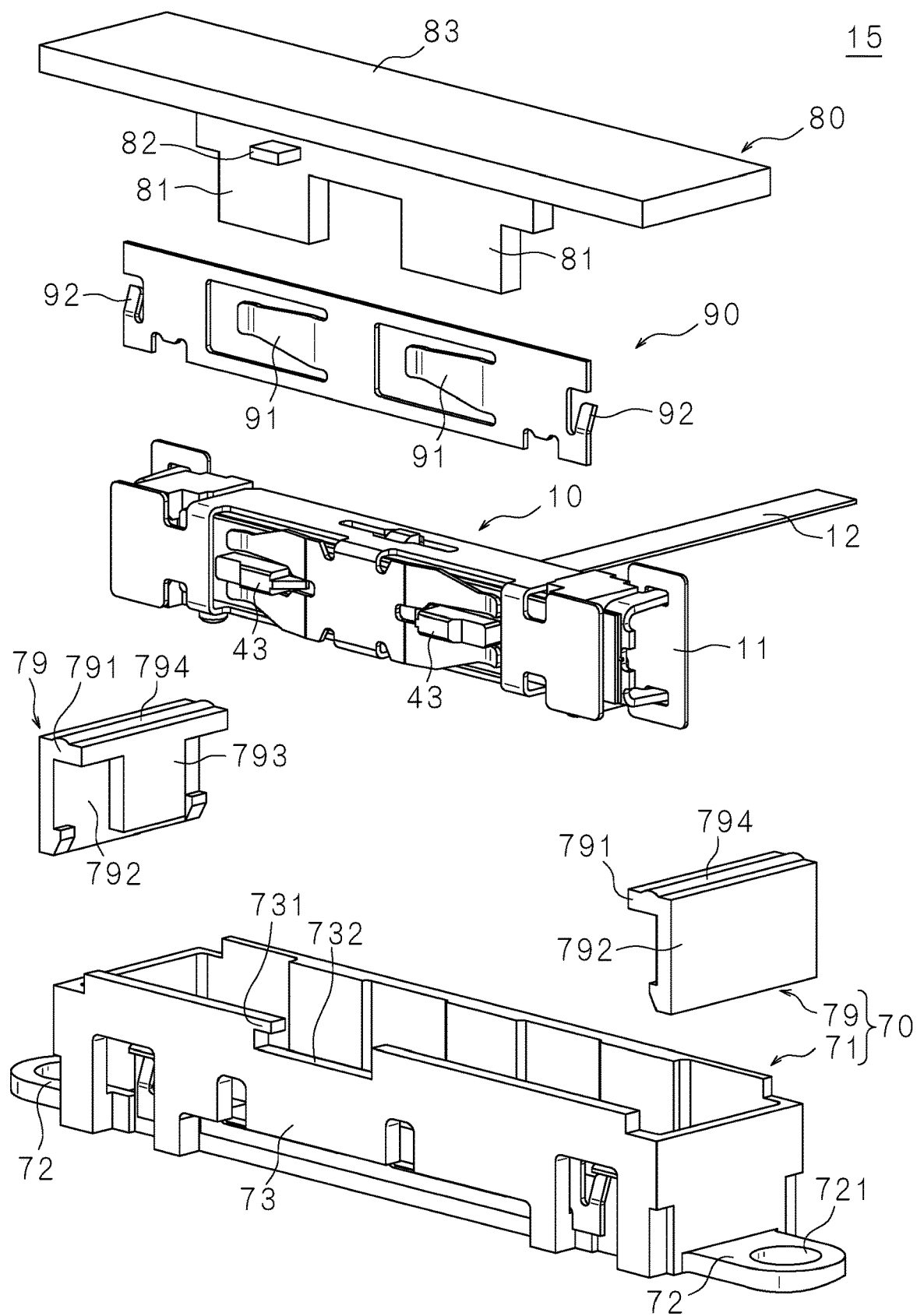
FIG. 7 is an exploded perspective view of the actuator.

FIG. 7 is an exploded perspective view of the actuator 15. The actuator 15 includes a flat spring 90 and an internal actuator 10 as well as the second mover 80 and the second stator 70 that are described above. The structure of the internal actuator 10 will be described later.

The second stator 70 includes a box-shaped housing 71 with an opening on one side and two edge frame portions 79. The housing 71 has a substantially-rectangular bottom surface. A fixation wall 73, which is a side wall on the front side in FIG. 7, stands upright from a long side of the bottom surface and has a substantially-rectangular cut-away portion 732 at the center of the edge portion thereof. The fixation wall 73 has a retainer reception portion 731 protruding rightward from the left edge of the cut-away portion 732 in FIG. 7.

The housing 71 has two mounting portions 72 extending outward from the short sides of the bottom surface. Each of the mounting portions 72 has a mounting aperture 721. The actuator 15 is secured to the casing part 130 by screws or the like that are inserted into the mounting apertures 721. The housing 71 is formed by die casting that is characterized by forcing metal, for example, aluminum or the like under high pressure into a mold. The housing 71 may be formed by injection molding of resin.

Each of the edge frame portions 79 has a substantially-rectangular guide plate portion 791, a side surface plate portion 792 extending from one long side of the guide plate portion 791, and a latch portion 793 protruding in a direction the same as the side surface plate portion 792 from the central portion of the other long side of the guide plate portion 791. The long side of the guide plate portion 791 has substantially the same length as the short side of the bottom surface of the housing 71. The side surface plate portion 792 has a retainer protruding on the same side as the guide plate portion 791 on its tip end. The space between the side surface plate portion 792 and the latch portion 793 is substantially the same as the thickness of the side wall of the housing 71.

The guide plate portion 791 has a ridge-like raised portion 794 having a substantially semicylindrical shape extending in parallel with its long side on the surface opposite to the surface from which the side surface plate portion 792 and the latch portion 793 protrude. It is noted that the ridge-like raised portion 794 may have any tapered ridge shape such as a substantially triangular prism shape, or the like. The edge frame portion 79 is made of resin having high slidability, for example, polytetrafluoroethylene or the like.

As illustrated in FIG. 6, the second stator 70 is formed such that the edge frame portion 79 is engaged with the edge of the short side of the housing 71 while the side surface plate portion 792 faces outside and the latch portion 793 faces inside. The ridge-like raised portion 794 is raised along the edge of the short side of the second stator 70.

Returning to FIG. 7, the second mover 80 includes a rectangular plate-shaped lid portion 83 having substantially the same dimensions as those of the bottom surface of the housing 71 and two sheets of pressing walls 81 substantially vertically protruding from a peripheral edge along the long side of the lid portion 83. The two sheets of pressing walls 81 are connected at the root thereof to form a U-shaped plate. A prism-shaped retainer protrusion 82 protrudes from the vicinity of the root of the left pressing wall 81 in FIG. 7.

The flat spring 90 has a rectangular plate shape one size smaller than the fixation wall 73 and has two U-shaped apertures that are arranged in the same orientation along the long side direction. Each of the apertures has an inner portion bent in the depth direction in FIG. 7 forming a biasing portion 91 of a flat spring. The flat spring 90 has rectangular flat spring latch portions 92 that are formed by substantially L-shaped cut-aways provided at the edges of the short sides thereof and that bend in the same direction as the biasing portion 91.

The flat spring 90 is produced by bending a metal plate for a flat spring such as a stainless steel plate for spring, a beryllium copper plate, or the like that has been cut in a predetermined shape. The flat spring 90 may be made of resin.

Figure 8:
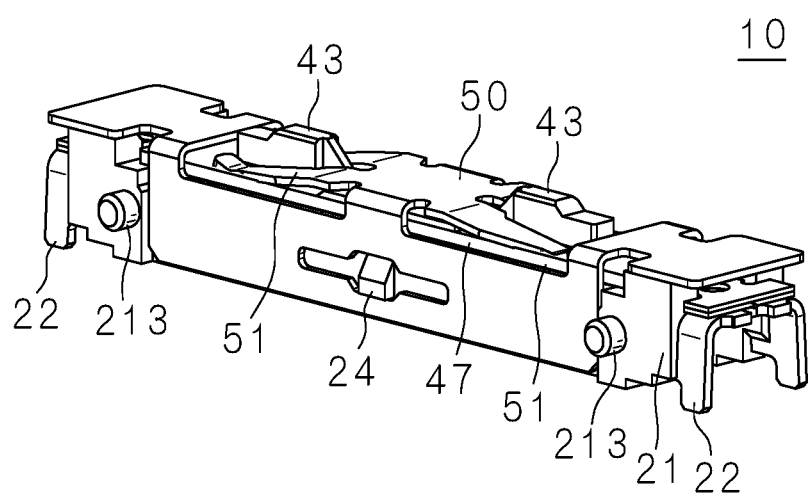
FIG. 8 is a perspective view of an internal actuator.

FIG. 8 is a perspective view of the internal actuator 10. FIG. 8 shows a state in which the internal actuator 10 illustrated in FIG. 7 is rotated to 90 degrees regarding the right and left direction in FIG. 7 as an axis. The internal actuator 10 has a substantially rectangular parallelepiped shape.

Figure 9:
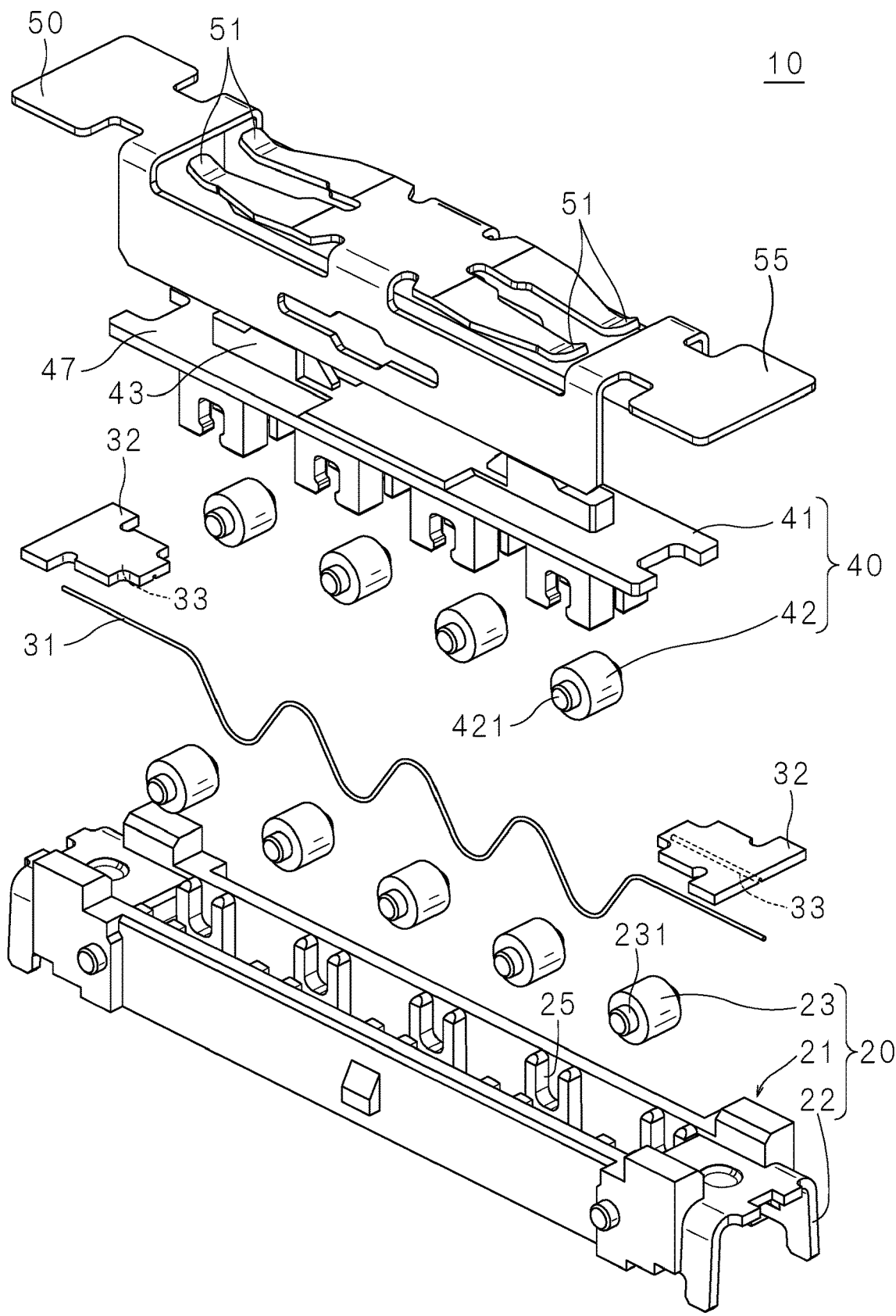
FIG. 9 is an exploded perspective view of the internal actuator.

FIG. 9 is a perspective view of the internal actuator 10. The internal actuator 10 includes a first stator 20, a first mover 40 and a fastener 50. The fastener 50 has four biasing springs 51 that press the first mover 40 against the first stator 20. The details of the structure of the first stator 20, the first mover 40 and the fastener 50 will be described later.

Figure 10:
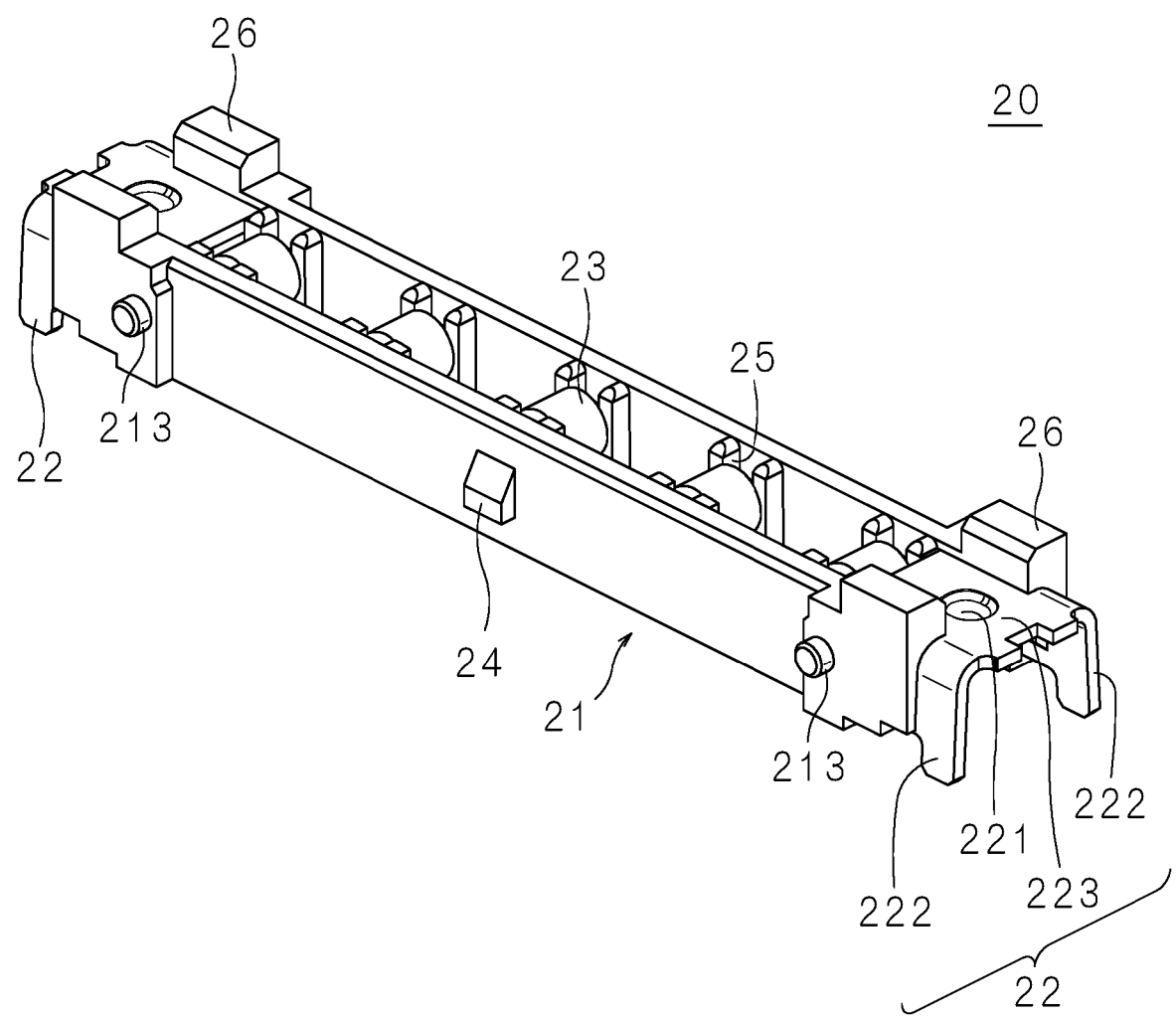
FIG. 10 is a perspective view of a first stator.

FIG. 10 is a perspective view of the first stator 20. With reference to FIGS. 9 and 10, the structure of the first stator 20 will be described. The first stator 20 has a stator frame 21, stator terminals 22 and five stator rollers 23.

Each of the stator rollers 23 is cylindrical. Each of the stator rollers 23 has cylindrical stator shaft portions 231 coaxially protruding from both end surfaces thereof. That is, the stator roller 23 has a stepped cylindrical shape having the stator shaft portions 231 on both ends that are thinner than the central portion.

The stator roller 23 is made of a material having high thermal conductivity. The material of the stator roller 23 includes, for example, metals such as aluminum, copper or the like, or ceramics such as aluminum nitride, silicon nitride or the like. The stator roller 23 may be made of resin.

The stator frame 21 is a substantially rectangular frame, and has five pairs of roller supporting portions 25 between the inner surfaces along the long side thereof. The roller supporting portions 25 in each pair are opposed to each other, and each of the roller supporting portions 25 is a substantially U-shaped groove that opens toward the direction the same as an opening of the stator frame 21. The width of the opening portion of the roller supporting portion 25 is a little greater than the diameter of the stator shaft portion 231. A single stator roller 23 is rotatably supported by a pair of opposing roller supporting portions 25.

From the four corners of the stator frame 21, fastener supporting portions 26 each having a substantially rectangular parallelepiped shape protrude in the direction toward which the stator frame 21 opens. The protruded height of the four fastener supporting portions 26 are equal. At a central part of the outer surfaces of both of the walls along the long side of the stator frame 21, fastener fixing protrusions 24 having a substantially rectangular parallelepiped shape are provided. At both ends of the outer surface of the one of the walls along the long side, cylindrical bosses 213 are provided so as to protrude in the direction in which the fastener fixing protrusions 24 protrude. The stator frame 21 is made of a material having insulation properties, for example, resin, ceramic or the like.

The stator terminals 22 are provided on both ends in the long side direction of the stator frame 21. The stator terminals 22 each have a rectangular terminal plate portion 223 that is disposed between the two fastener supporting portions 26 and outwardly extends from each end of the stator frame 21. From the edge of the terminal plate portions 223, terminal leg portions 222 extend along the long-side surface of the stator frame 21. At the central part of the terminal plate portion 223, a terminal concave portion 221, which is a shallow recess, is provided.

Each stator terminal 22 is formed by bending a metal plate having high electrical conductivity such as brass, phosphor bronze or the like. The surface of the stator terminal 22 is coated with a layer for easy soldering such as a tin-plated layer, a gold-plated layer or the like. The two stator terminals 22 are insulated from each other. The two stator terminals 22 are formed as an integral part of the stator frame 21 by insert molding.

The surface of the right and left terminal plate portions 223 are desirably close to the tangential line common to the five stator rollers 23. The reason will be described later.

Figure 11:
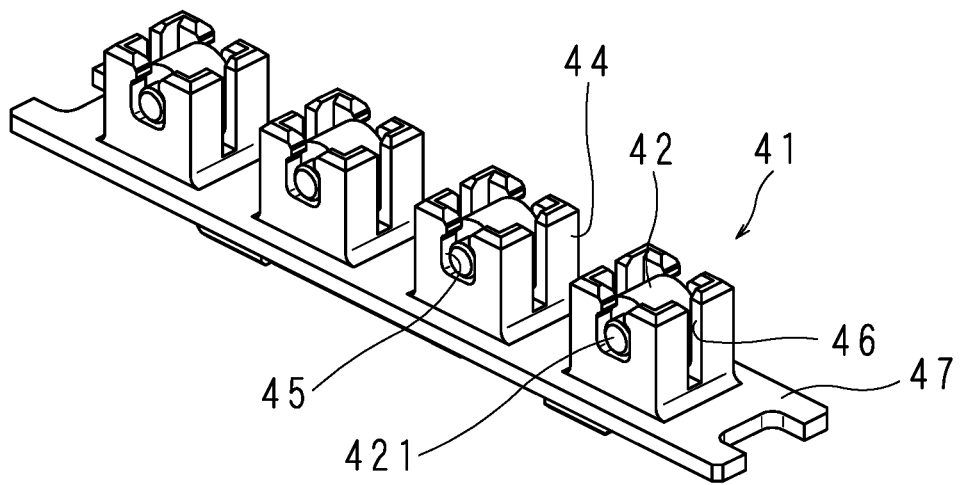
FIG. 11 is a perspective view of a first mover.

FIG. 11 is a perspective view of the first mover 40. FIG. 11 illustrates the first mover 40 in FIG. 9 upside down. With reference to FIGS. 9 and 11, the structure of the first mover 40 will be described. The first mover 40 has a mover frame 41 and four mover rollers 42.

Each of the mover rollers 42 is cylindrical. Each of the mover rollers 42 has cylindrical mover shaft portions 421 coaxially protruding from both end surfaces thereof. The mover roller 42 is made of a material having high thermal conductivity.

The mover frame 41 has a top plate portion 47 and four rectangular box-shaped roller holding portions 44. The top plate portion 47 has a substantially-rectangular plate shape having substantially the same length in the short side direction as the stator frame 21 and having a shorter length in the long side direction as compared with the stator frame 21. The roller holding portions 44 are arranged on one of the surfaces of the top plate portion 47 in the long side direction of the top plate portion 47. At the central part of the walls located in the direction crossing the direction in which the roller holding portions 44 are arranged, a first wire passing groove 46 is provided.

On the walls along the direction in which roller holding portions 44 are arranged, roller holding grooves 45 are provided. Each of the roller holding grooves 45 has a substantially U shape and narrows its width at its opening to form a retainer. The width of the roller holding groove 45 is a little greater than the diameter of the mover shaft portion 421. The mover frame 41 is made of a material having insulation properties, for example, resin, ceramic, or the like.

A single mover roller 42 is rotatably supported inside the roller holding portion 44 by a pair of opposing roller holding grooves 45. The action of the retainer provided at the entrances of the roller holding grooves 45 prevents the mover roller 42 from falling even if the top plate portion 47 is placed at the upper side while holding the first mover 40.

As illustrated in FIGS. 8 and 9, on the surface opposite to the surface provided with the roller holding portions 44 of the top plate portion 47, two substantially rectangular parallelepiped pressing portions 43 are aligned in the long side direction. The two pressing portions 43 have the same protruded height from the top plate portion 47.

Figure 12:
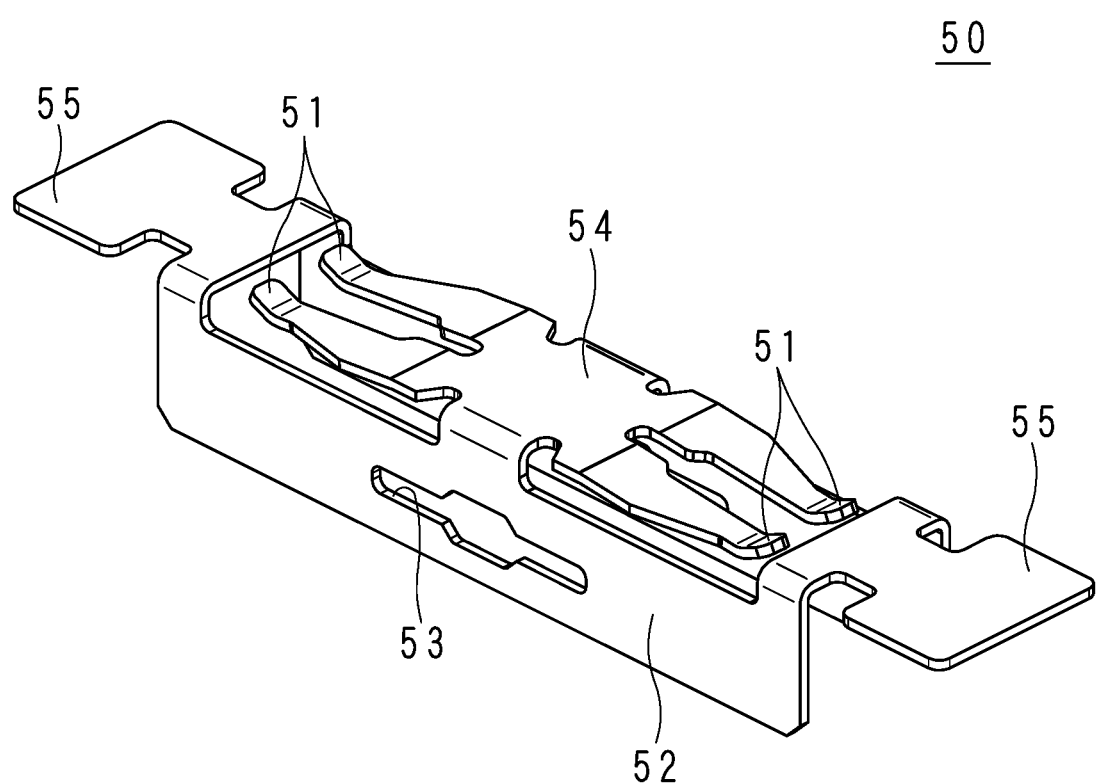
FIG. 12 is a perspective view of a fastener.

FIG. 12 is a perspective view of the fastener 50. The structure of the fastener 50 will be described in detail below with reference to FIG. 12. The fastener 50 has two side plate portions 52 that are opposed to each other. Each of the side plate portions 52 is substantially-rectangular elongated in the right-left direction. The two sheets of side plate portions 52 are connected by a connecting portion 54 spanning the space therebetween at the central portion and by supporting plate portions 55 spanning the space therebetween at both ends.

The connecting portion 54 is substantially rectangular having the long side direction the same as that of the side plate portion 52. From each of the edges of the short side of the connecting portion 54, two tapered biasing springs 51 extend. The biasing springs 51 gently bend in the direction the same as the side plate portion 52 and bend in the opposite direction near the tip end. Hence, a total of four biasing springs 51 are formed on both sides of the connecting portion 54. The function of the biasing springs 51 will be described later.

Each of the supporting plate portions 55 is substantially rectangular. The two sheets of the supporting plate portions 55 are flush with the connecting portion 54. At the central portion of each of the side plate portions 52, a mounting aperture 53, which is a slot elongated in the direction parallel to the long side direction of the side plate portion 52, is provided. The mounting aperture 53 is wider at the central portion. The function of the mounting aperture 53 will be described below.

The space between the two sheets of side plate portions 52 is substantially the same as the axially external dimension of the stator roller 23 of the first stator 20. The length between the both edges of the two sheets of supporting plate portions 55 along the long side direction of the side plate portion 52 is substantially the same as the length in the long side direction of the first stator 20.

The fastener 50 is produced by bending a metal plate for a flat spring such as a stainless steel plate for spring, a beryllium copper plate, or the like that has been cut in a predetermined shape. The fastener 50 may be made of resin.

Figure 13:
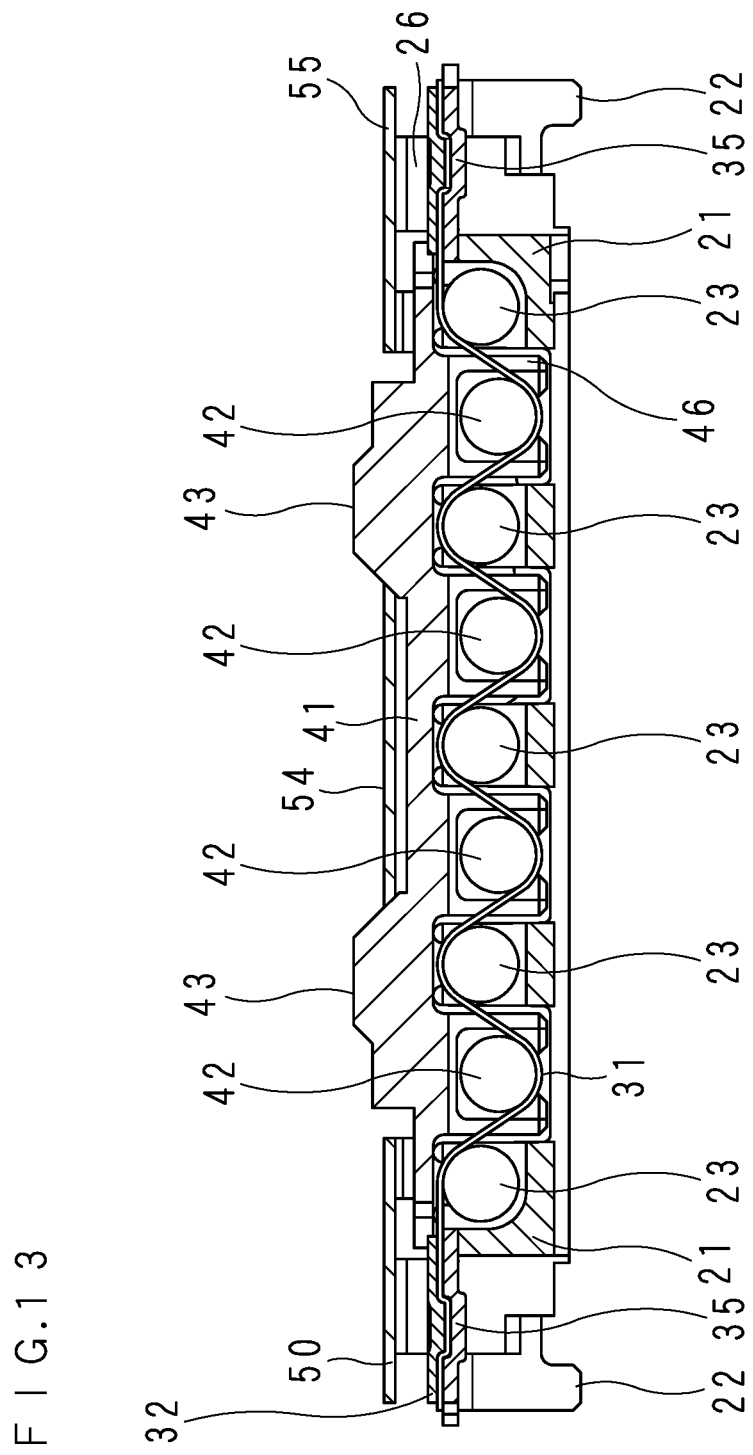
FIG. 13 is a cross-sectional view of the internal actuator.

FIG. 13 is a cross-sectional view of the internal actuator 10. With reference to FIGS. 8 to 13, the outline of the assembly method for the internal actuator 10 will be described.

As described with reference to FIG. 10, the stator shaft portions 231 of the stator roller 23 are inserted into the roller supporting portions 25 of the stator frame 21 to assemble the first stator 20. As described with reference to FIG. 11, the mover shaft portions 421 of the mover roller 42 are inserted into the roller holding grooves 45 of the mover frame 41 to assemble the first mover 40.

A wire 31 is placed along the direction in which the stator rollers 23 are aligned. The wire 31 has a diameter a little less than 0.1 mm. The wire 31 is capable of passing through the above-mentioned first wire passing groove 46. The wire 31 is made of a shape memory alloy. The wire 31 instantly shortens by approximately 4% to 5% if the temperature exceeds the transformation point, and returns to the original length when cooled. The transformation point of the wire 31 used in the present embodiment is on the order of 70° C. to 100° C.

The first mover 40 is positioned relative to the first stator 20 such that the mover rollers 42 are opposed to the respective clearances between the stator rollers 23. Here, the position of the wire 31 is adjusted such that the first wire passing groove 46 is aligned with the wire 31.

The first mover 40 is brought closer to the first stator 20 such that the mover rollers 42 and the mover frame 41 are inserted into the stator frame 21. As illustrated in FIG. 10, between the inner surfaces of the front wall and the rear wall of the stator frame 21, concavities are formed between the roller supporting portions 25 to receive the respective roller holding portions 44.

The wire 31 is drawn into the interior of the stator frame 21 by rotations of the stator rollers 23 and the mover rollers 42 to have a wavy shape alternately passing through the first mover 40 side of the stator rollers 23 and the first stator 20 side of the mover rollers 42 as illustrated in FIG. 13. The wire 31 passes through the first wire passing groove 46 between the stator rollers 23 and the mover rollers 42.

The side surface on the first mover 40 side of the stator roller 23 serves as a stator convex portion for supporting the wire 31 on the first stator 20 side. The side surface on the first stator 20 side of the mover roller 42 serves as a mover convex portion for supporting the wire 31 on the first mover 40 side.

The action of the stator rollers 23 and the mover rollers 42 can prevent a trouble, for example, a break in the wire 31 or the like during assembly due to excessive tensile stress applied to a part of the wire 31. This makes it possible to achieve installation of the first stator 20 and the first mover 40 at high speed and high yielding.

Returning to FIG. 9, fixation of the ends of the wire 31 will be described. As illustrated in FIG. 7, the internal actuator 10 has two sheets of second terminal plates 32 being substantially T-shaped plates. Each of the second terminal plates 32 has a wire holding groove 33 at the portion corresponding to the leg of the "T" as indicated by the broken line on one surface thereof. The wire holding groove 33 is a U-shaped groove having substantially the same width and depth as the contour of the wire 31. The second terminal plate 32 is made of a metal having high electrical conductivity such as brass, phosphor bronze or the like.

The second terminal plate 32 is stacked on the terminal plate portion 223 with the wire 31 fit into the wire holding groove 33. A punch is pressed from the second terminal plate 32 side to the position corresponding to the terminal concave portion 221 while the terminal plate portion 223 is supported by a die to thereby swage and fix the terminal plate portion 223, the wire 31 and the second terminal plate 32, thereby achieving the swaging and fixing of the wire 31.

By swaging and fixing, the wire 31, the stator terminal 22 and the second terminal plate 32 are electrically and mechanically connected. This allows for better electrical conduction between the wire 31 and the stator terminals 22. Then, the redundant portions of the wire 31 positioned outside the stator terminals 22 are cut and removed, which brings about a state where the wire 31 are connected at both ends to the respective stator terminals 22.

Next, the fastener 50 is placed over the first mover 40 to engage the mounting apertures 53 with the fastener fixing protrusions 24. The details will be described. As illustrated in FIGS. 8 and 10, the surface of the fastener fixing protrusion 24 on the first mover 40 side is outwardly tilted. The edge of the side plate portion 52 spreads over the tilted surface of the fastener fixing protrusion 24. As described above, the mounting aperture 53 is a slot, through which the fastener fixing protrusion 24 can pass by elastic deformation. The fastener 50 allows the fastener fixing protrusion 24 to pass through the mounting aperture 53, and then is elastically recovered. Hence, the fastener fixing protrusion 24 is engaged with the mounting aperture 53 as illustrated in FIG. 8.

The first mover 40 is pressed against the first stator 20 by the biasing springs 51. As described above, a total of four biasing springs 51 are provided on the short sides of the connecting portion 54, so that the first mover 40 are evenly pressed against the stator 20 in the long side direction and in the short side direction thereof. This brings about a state where the pressing portions 43 protrude from the spaces between the biasing springs 51 on the right and left sides as illustrated in FIG. 8. This completes the internal actuator 10 illustrated in FIG. 8.

As illustrated in FIGS. 8 and 13, the fastener supporting portions 26 abuts against the supporting plate portions 55 to thereby fix the fastener 50 on the stator frame 21. As illustrated in FIG. 8, the biasing springs 51 bias the top plate portion 47 toward the first stator 20.

As illustrated in FIG. 13, a space is provided between the connecting portion 54 and the top plate portion 47. The function of the space will be described later.

The five stator rollers 23 and the four mover rollers 42 are alternately arranged in parallel. The wire 31 is curved so as to alternately pass through the first mover 40 side of the stator rollers 23 and the first stator side 20 of the mover rollers 42. The edge portion of the stator terminals 22, which are connected to both ends of the wire 31, protrude downward exceeding the bottom surface of the stator frame 21.

Returning to FIG. 7, the stator terminals 22 of the internal actuator 10 are inserted into the holes provided on the substrate 11 so as to be electrically and mechanically connected by soldering, or the like. The two stator terminals 22 are connected to a wiring pattern on the FPC 12 via a wiring pattern (though not illustrated) provided on the substrate 11. This allows pulse voltage to be applied across the two connection terminals of the internal actuator 10 through the FPC 12 and the substrate 11.

Figure 14:
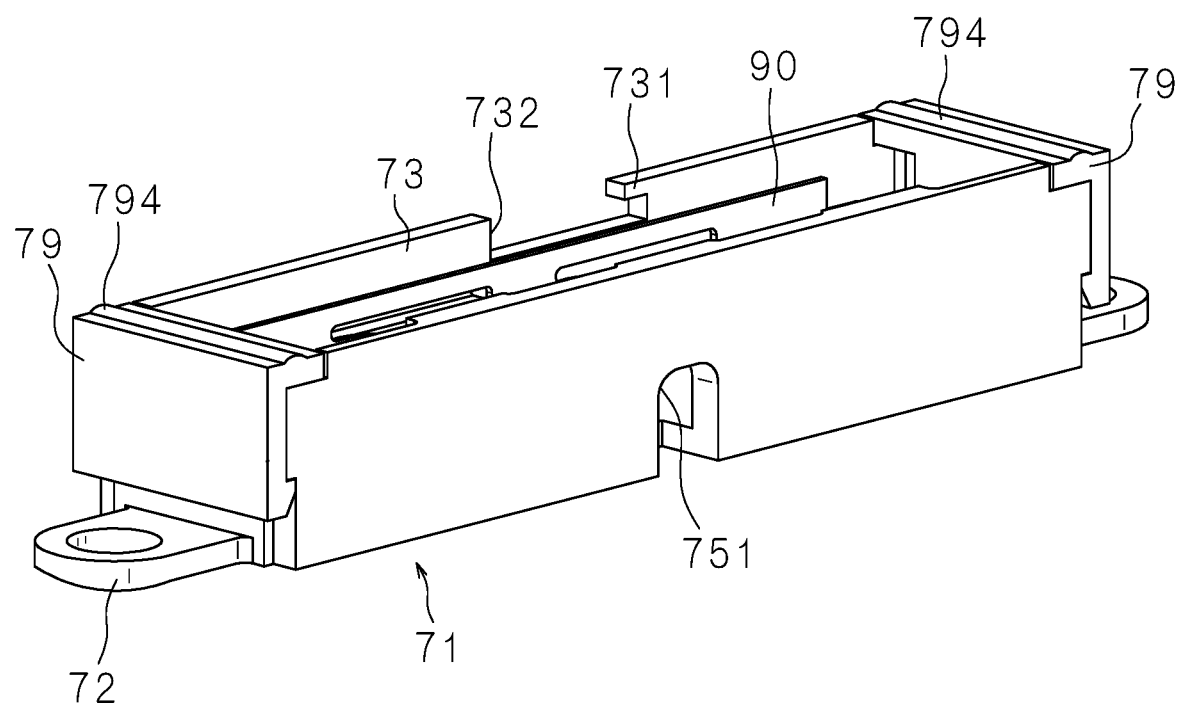
FIG. 14 illustrates an assembly process of the actuator.
Figure 15:
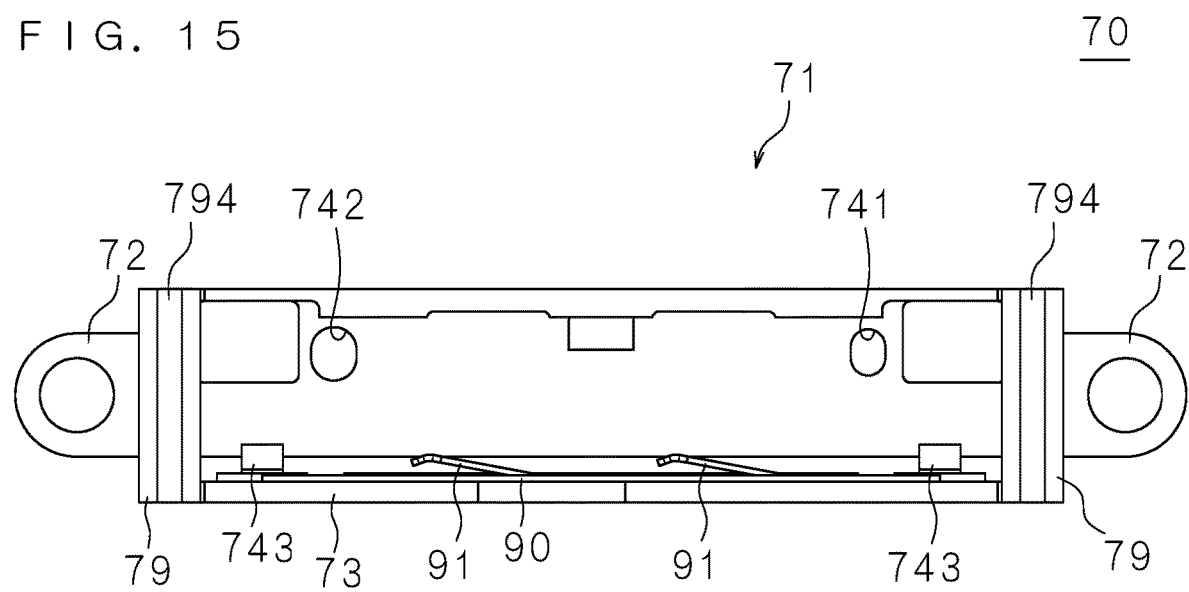
FIG. 15 illustrates the assembly process of the actuator.

FIGS. 14 to FIG. 19 illustrate the assembly process of the actuator 15. FIG. 14 is an perspective view of the housing 71 to which the edge frame portions 79 and the flat spring 90 have been attached when viewed from the side opposing to FIG. 14. FIG. 15 illustrates a top view of the housing 71 to which the edge frame portion 79 and the flat spring 90 have been attached similarly to FIG. 14.

The housing 71 has two prismatic flat spring fixing protrusions 743 extending from the bottom surface thereof along the fixation wall 73. The space between the fixation wall 73 and the flat spring fixing protrusion 743 is substantially the same as the thickness of the flat spring 90. As illustrated in FIG. 15, the flat spring 90 is inserted between the fixation wall 73 and the flat spring fixing protrusions 743 with the biasing portions 91 facing opposite to the fixation wall 73. The flat spring latch portions 92 described with reference to FIG. 7 hook the depressions provided in the housing 71 and functions as retainers as illustrated in FIG. 6.

On the bottom surface of the housing 71, a first boss aperture 741 and a second boss aperture 742 that have oval cross sections are arranged with their major axes along the short side direction of the housing 71. The space between the major axis of the first boss aperture 741 and the major axis of the second boss aperture 742 is substantially the same as the space between the two bosses 213 disposed on the internal actuator 10 as described with reference to FIG. 8.

The minor axis of the first boss aperture 741 is substantially the same as the diameter of the boss 213 described with reference to FIG. 8. The minor axis of the second boss aperture 742 is greater than the diameter of the boss 213 by approximately 0.2 mm to 0.5 mm.

Figure 16:
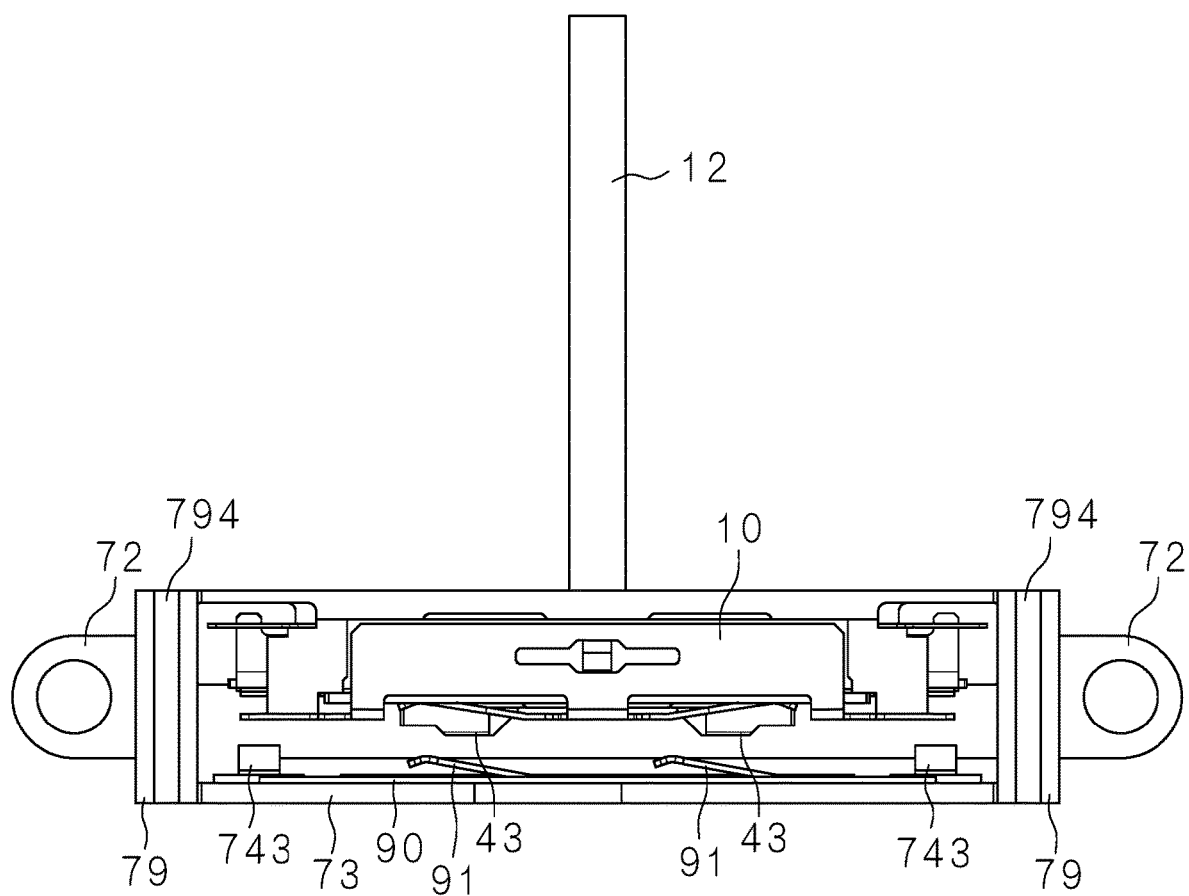
FIG. 16 illustrates the assembly process of the actuator.

FIG. 16 illustrates a state where the internal actuator 10 has been inserted into the housing 71 with the pressing portions 43 opposed to the biasing portions 91. The respective two bosses 213 of the internal actuator 10 are inserted into the first boss aperture 741 and the second boss aperture 742. The first boss aperture 741 has the function of fixing the position of the internal actuator 10 in the long side direction of the housing 71 at a predetermined position. The second boss aperture 742 has a play to thereby absorb an effect of production errors of the housing 71 and the internal actuator 10.

As illustrated in FIG. 14, the housing 71 has an FPC hole 751 on the side surface opposing to the fixation wall 73. As illustrated in FIG. 7, the FPC 12 attached to the internal actuator 10 is drawn out of the housing 71 through the FPC hole 751 and connected to the FPC connector 161 provided on the circuit board 160 described with reference to FIG. 4.

Figure 17:
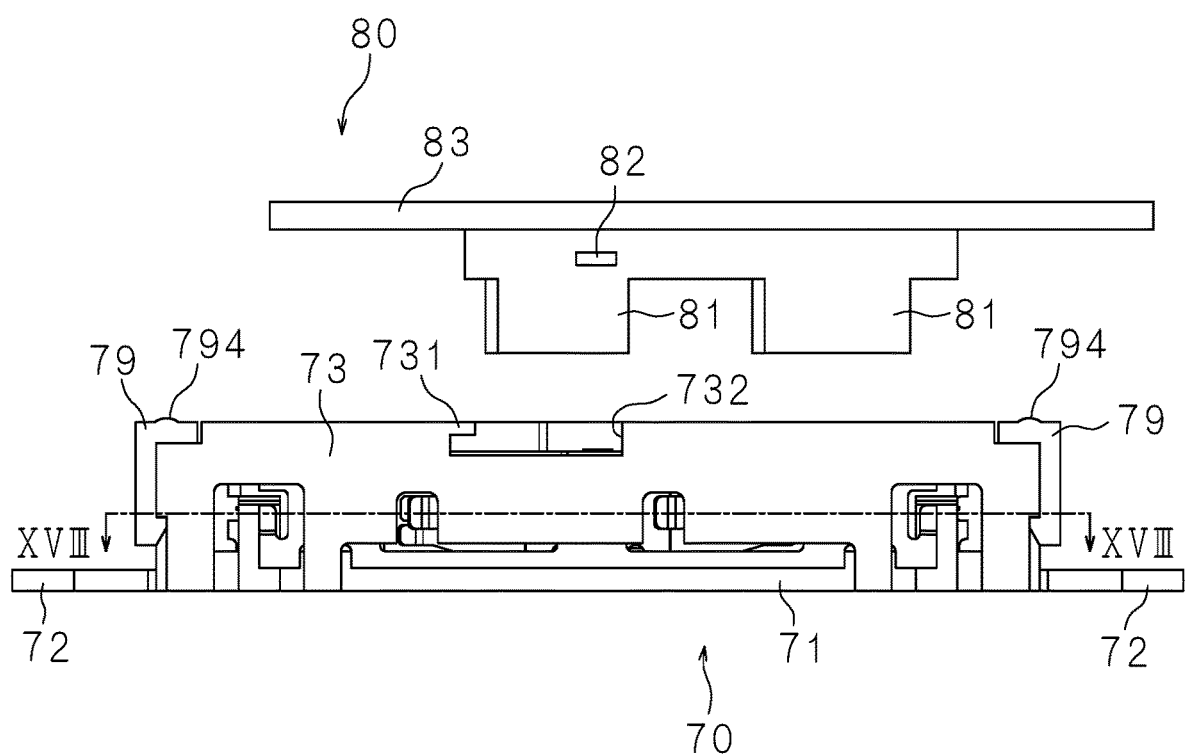
FIG. 17 illustrates the assembly process of the actuator.

FIG. 17 is a side view illustrating a state where the second mover 80 is being attached to the second stator 70. While facing the pressing walls 81 toward the opening of the housing 71, the second mover 80 is positioned such that the retainer protrusion 82 is engaged with the cut-away portion 732, away from the retainer reception portion 731.

Figure 18:
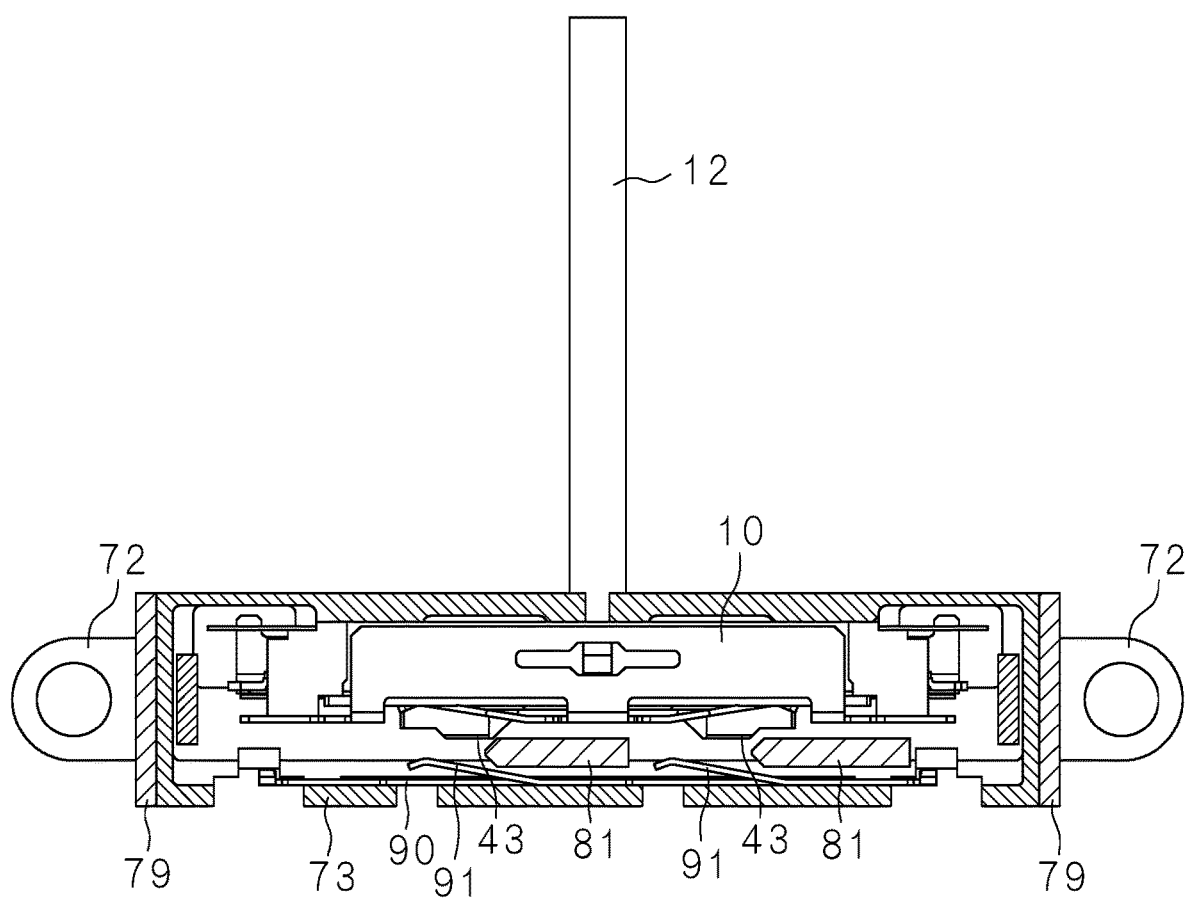
FIG. 18 illustrates the assembly process of the actuator.

FIG. 18 illustrates a cross-sectional view taken along line XVIII-XVIII in FIG. 17 after the pressing walls 81 have been inserted into the housing 71 until the lid portion 83 impacts the ridge-like raised portions 794. The pressing walls 81 are located at portions where the biasing portions 91 do not project. This allows the pressing walls 81 to easily be inserted between the biasing portions 91 and the internal actuator 10.

Figure 19:
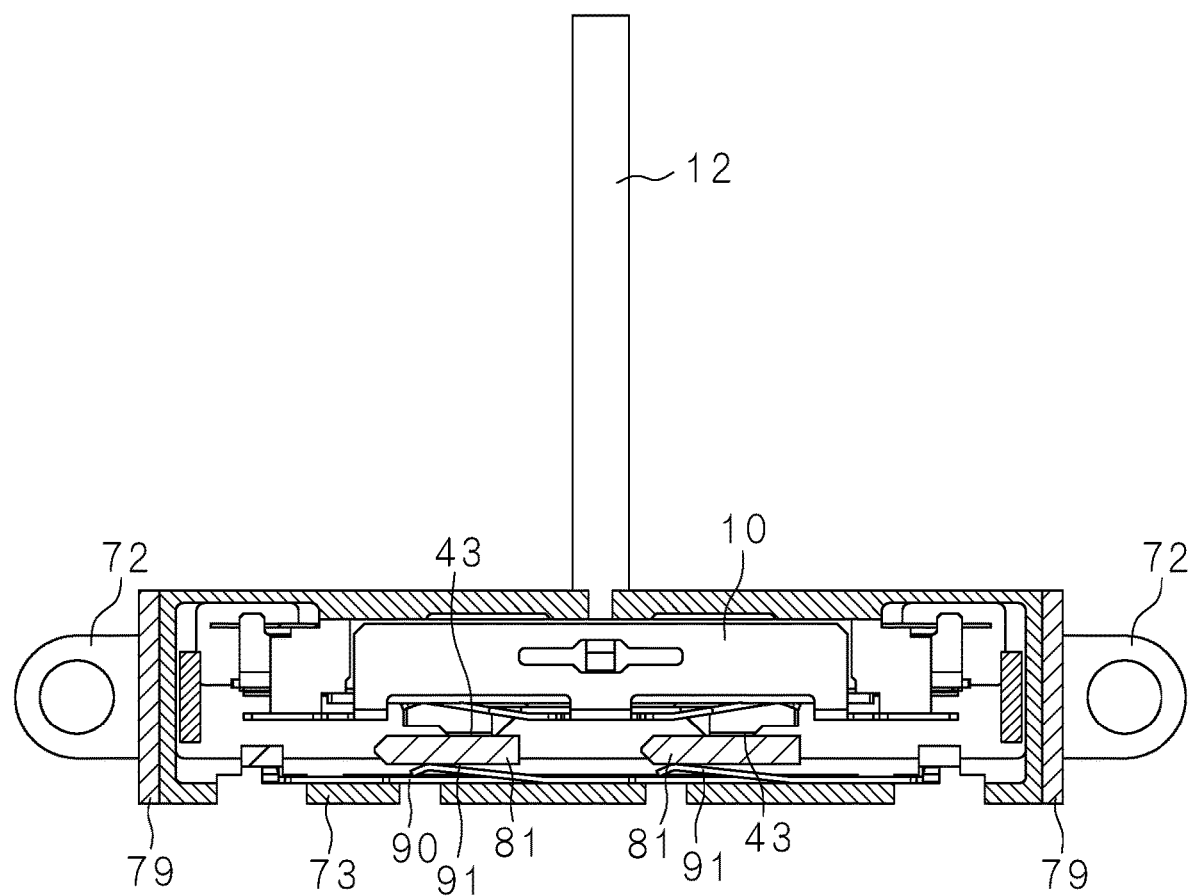
FIG. 19 illustrates the assembly process of the actuator.

FIG. 19 illustrates a state where the second mover 80 has slid from the state illustrated in FIG. 18 to the left in FIG. 18 relative to the second stator 70. As illustrated in FIGS. 18 and 19, the pressing walls 81 are tapered at the left edge surface to thereby move while widening the space between the biasing portions 91 and the pressing portions 43.

As illustrated in FIG. 6, the retainer protrusion 82 is engaged with the retainer reception portion 731. Hence, the actuator 15 illustrated in FIG. 6 is completed. It is desirable that there is a clearance between the retainer protrusion 82 and the retainer reception portion 731. The function of this clearance will be described below.

Figure 20:
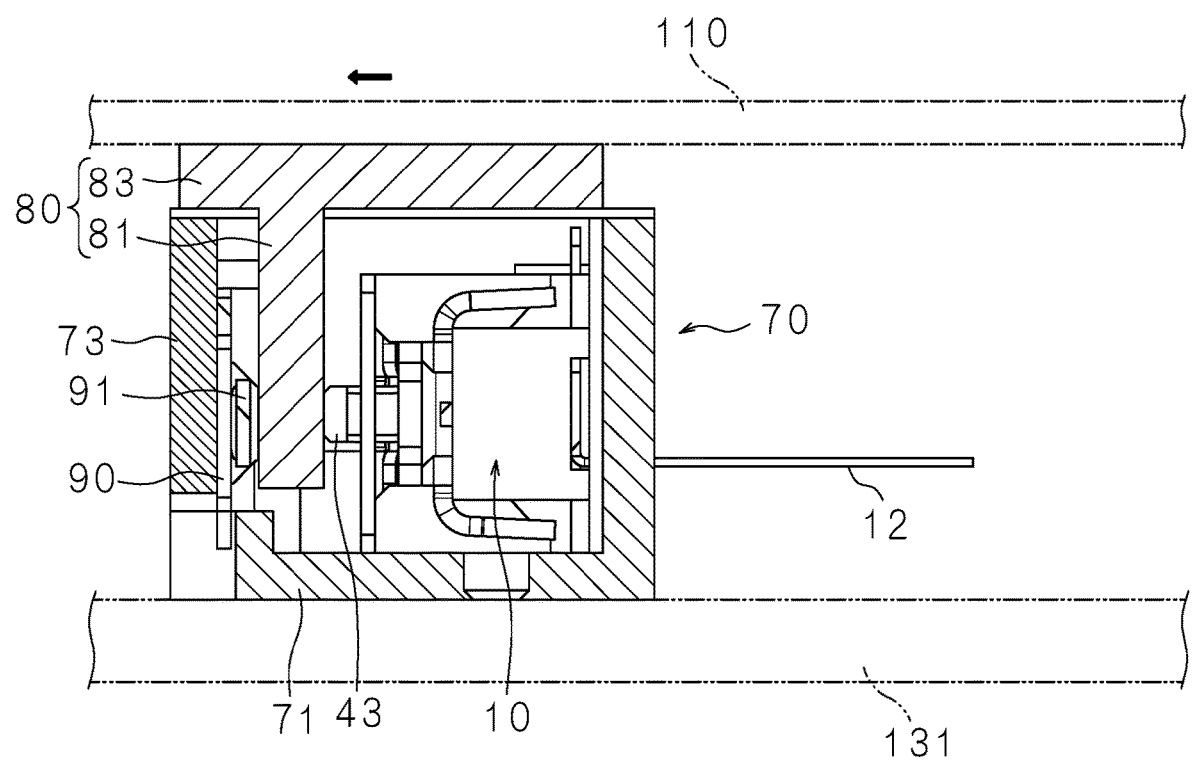
FIG. 20 is a cross-sectional view of the actuator.

FIG. 20 is a cross-sectional view of the actuator 15. FIG. 20 illustrates a cross section obtained when the actuator 15 is cut through a section passing through the pressing wall 81 and the pressing portion 43. The actuator 15 is used while being sandwiched from top and bottom between the bottom plate 131 and the transparent plate 110 as shown with the phantom line in FIG. 20. The lid portion 83 and the transparent plate 110 are fixed by the double-sided tape 111 as illustrated in FIG. 2.

It is noted that the lid portion 83 and the transparent plate 110 may be fixed by engagement of a protrusion provided on the lid portion 83 and a hole provided on the transparent plate 110. The lid portion 83 and the transparent plate 110 may be fixed by engagement with the protrusion and the hole as well as the double-sided tape in combination. The lid portion 83 and the transparent plate 110 may be fixed by an adhesive agent.

In the states illustrated in FIGS. 19 and 20, the pressing walls 81 are biased toward the internal actuator 10 by the biasing portions 91.

Figure 21:
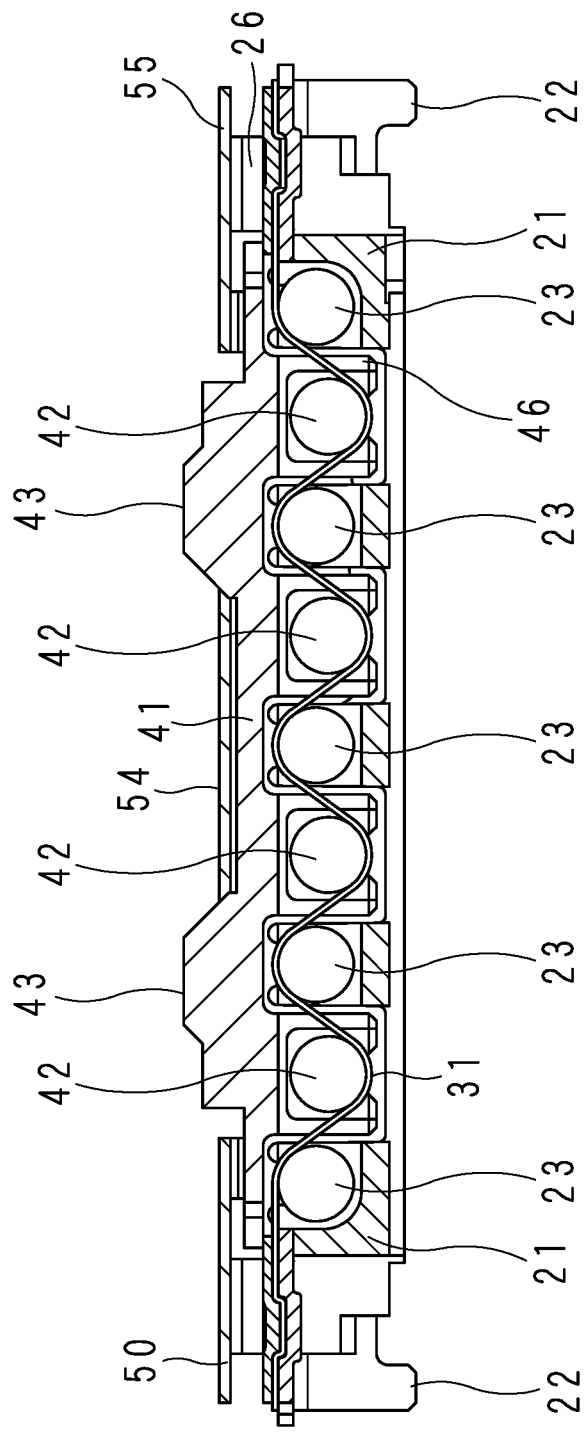
FIG. 21 illustrates an operating state of the internal actuator.

The operation of the actuator 15 will be described. FIG. 21 illustrates an operating state of the internal actuator 10. With reference to FIGS. 13 and 21, the operation of the internal actuator 10 will be described.

FIG. 13 illustrates the initial state of the internal actuator 10. By application of pulse voltage across the stator terminals 22 via the FPC 12, the wire 31 instantly generates heat by Joule heat. The wire 31 instantly shortens if the temperature exceeds the transformation point. The wire 31 shortens to thereby move the mover rollers 42 in the direction away from the first stator 20. As the mover rollers 42 move, the first mover 40 pushes the biasing springs 51 to move in the direction away from the first stator 20.

The above-described space between the connecting portion 54 and the top plate portion 47 is the space through which the top plate portion 47 can move if the first mover 40 is moved. The space is high enough to prevent a collision between the connecting portion 54 and the top plate portion 47 if predetermined pulse voltage is applied across the two stator terminals 22.

When the application of the pulse voltage is completed, the generation of Joule heat is stopped. The heat generated in the wire 31 is dissipated to the outside through the stator rollers 23 and the mover rollers 42, which lowers the temperature of the wire 31 to the transformation point or below. By the action of the biasing springs 51, the first mover 40 is pressed against the first stator 20, which returns the internal actuator 10 to the state described with reference to FIG. 13.

The heat capacity of the wire 31 is much smaller than that of the entire internal actuator 10, so that even if the actuator 10 is operated by repetitively applying pulse voltage, the temperature of the entire actuator 10 is scarcely raised. It is noted that the internal actuator 10 may be attached with a cooling mechanism such as a Peltier element, a heatsink or the like if it is frequently operated.

As described above, by application of pulse voltage, the space between the first stator 20 and the first mover 40 instantly increases and then returns to the original state.

With reference to FIG. 19, the first mover 40 instantly presses the pressing walls 81 toward the fixation wall 73. Then, the pressing walls 81 return to the original state by the action of the biasing portions 91. That is, the second mover 80 moves cooperatively with the first mover 40. At this time, the first stator 20 and the second stator 70 are still.

Hence, by application of pulse voltage through the FPC 12, the second mover 80 instantly moves as indicated by the bold arrow in FIG. 6 and returns to the original state. Along the side surfaces of the housing 71 on the short side, the ridge-like raised portions 794 are provided, which reduces the friction between the second mover 80 and the second stator 70. Hence, it is possible to provide the actuator 15 that allows the second mover 80 to instantly move if pulse voltage is applied.

Figure 22:
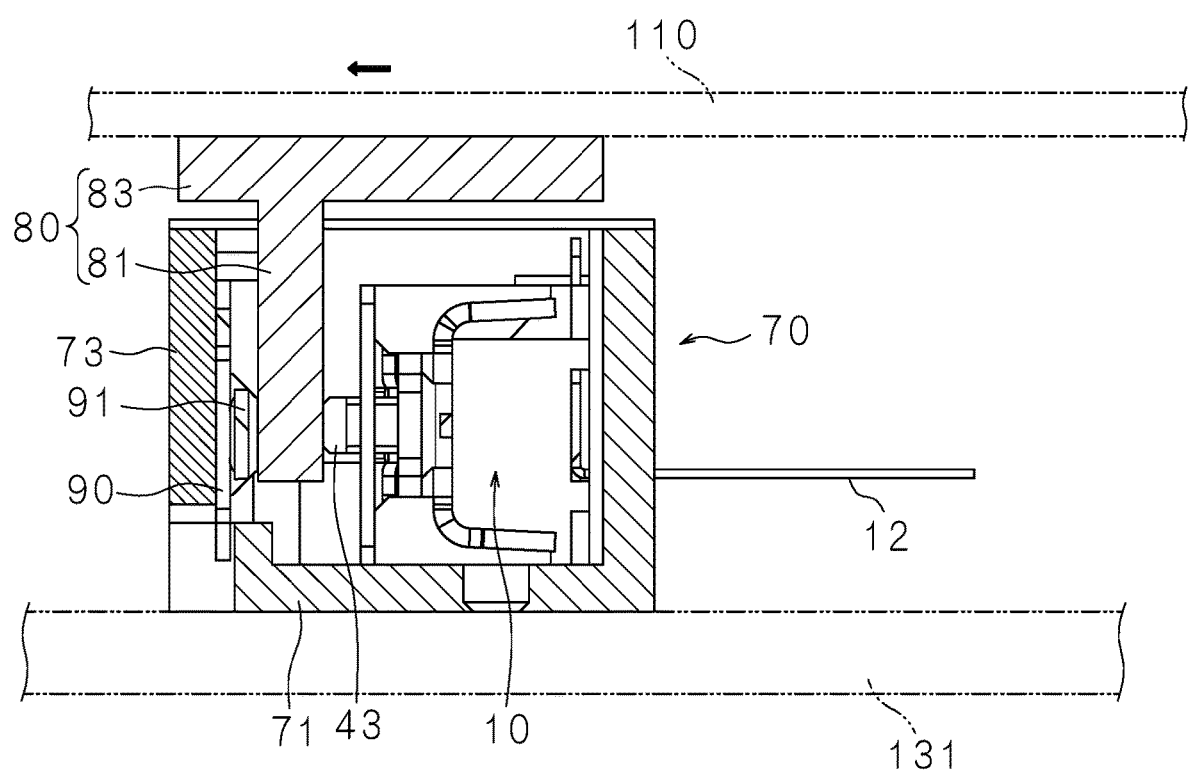
FIG. 22 is a cross-sectional view illustrating the actuator in use.

FIG. 22 is a cross-sectional view illustrating the actuator 15 in use. FIG. 22 illustrates an example where the space between the bottom plate 131 and the transparent plate 110 is wider than that in FIG. 20. As described above, the second stator 70 is fixed to the bottom plate 131, while the second mover 80 is fixed to the transparent plate 110.

In FIG. 22, the pressing wall 81 is slightly pulled out of the housing 71. Here, the pressing wall 81 can be pulled out by the length of the clearance between the retainer protrusion 82 and the retainer reception portion 731. Similarly to FIG. 20, the pressing wall 81 is biased toward the pressing portions 43 by the biasing portion 91. Thus, it is possible to provide the tactile sense provision apparatus 100 attachable even if there are variations in the distance between the bottom plate 131 and the transparent plate 110.

Figure 23:
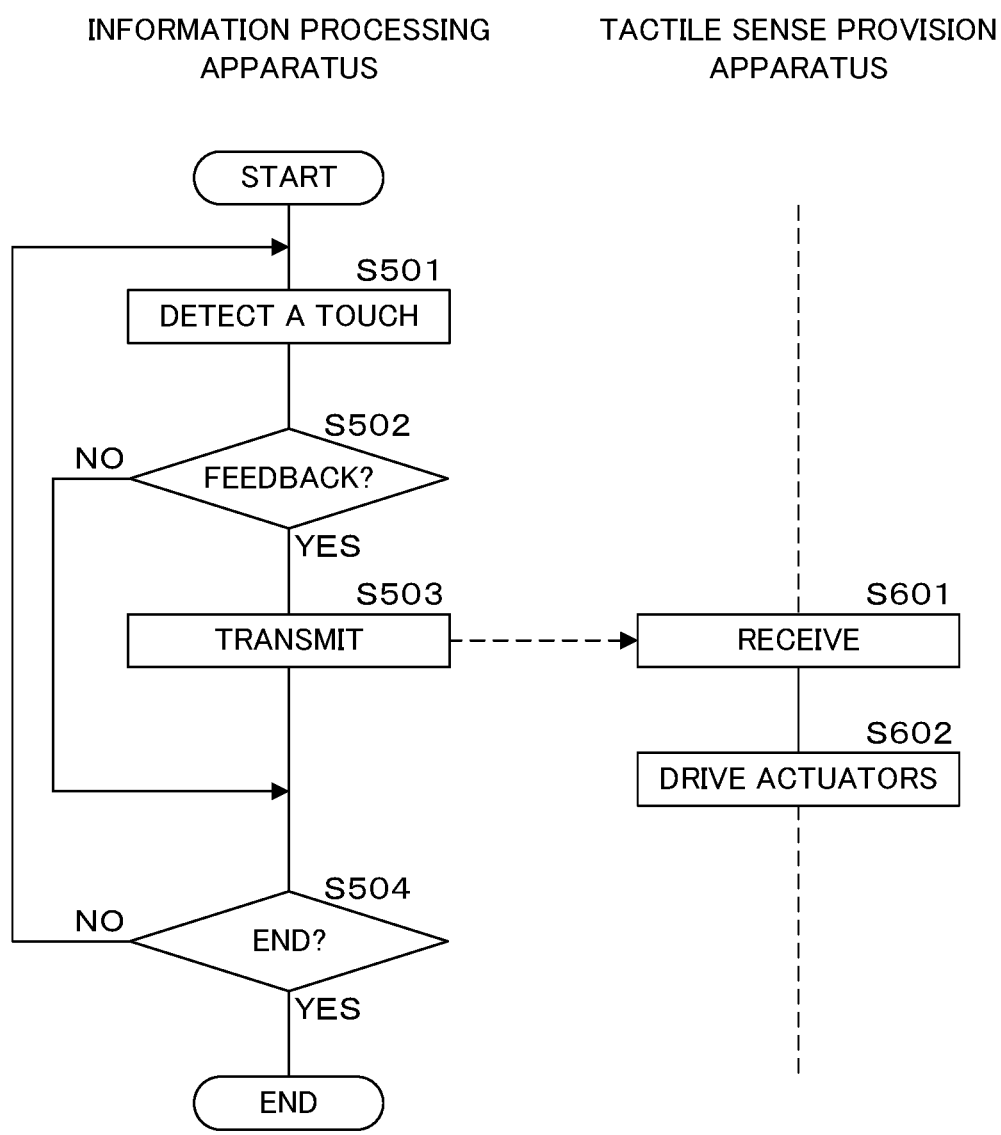
FIG. 23 is a flowchart showing a flow of the processing of a program.

FIG. 23 is a flowchart showing a flow of the processing of a program. The second CPU 371 detects a touch on the touch panel 376 (step S501). The second CPU 371 determines whether or not tactile feedback is to be performed in response to the touch (step S502).

The second CPU 371 determines that tactile feedback is performed if an input to a button displayed on the screen is accepted as illustrated in FIG. 1, for example. In the case where a keyboard is displayed on the touch panel 376, the second CPU 371 determines that tactile feedback is to be performed if key entry is accepted. The second CPU 371 may determine that tactile feedback is to be performed if an error indication is performed in response to the operation by the user.

If it is determined that the tactile feedback is to be performed (YES at step S502), the second CPU 371 transmits a signal through the second communication unit 374 (step S503). The first CPU 171 receives the signal through the first communication unit 174 (step S601). The first CPU 171 applies pulse voltage to the actuator 15 via the control I/F 175 to thereby drive the actuator 15 (step S602). By step S601, the first communication unit 174 functions as a reception unit of the present embodiment.

If it is determined that the tactile feedback is not to be performed (NO at step S502), or after completion of step S503, the second CPU 371 determines whether or not the processing is to be ended (step S504). If the second CPU 371 receives an instruction of stopping a tactile feedback function from the user, or if an application program employing the tactile feedback function is completed, for example, it is determined that the processing is ended.

If it is determined that the processing is not to be ended (NO at step S504), the second CPU 371 returns the processing to step S501. If it is determined that the processing is to be ended (YES at step S504), the second CPU 371 ends the processing.

At step S502, the second CPU 371 may set the number of times for tactile feedback or an interval used for the tactile feedback or the like, and may transmit a signal based thereon at step S503. Depending on the operation by the user, different tactile feedback may be provided. For example, tactile feedback is performed once if a "YES" button on the screen is selected while tactile feedback is performed twice if a "NO" button is selected.

According to the present embodiment, it is possible to provide the tactile sense provision apparatus 100 that provides the tactile feedback function to the touch panel 376 of the information processing apparatus 300 such as a general-purpose tablet, a smartphone or the like.

The transparent plate 110 vibrates in the in-plane direction, and thus, the sound incidental to the vibrations is also emitted toward the in-plane direction of the transparent plate 110. This makes it possible to provide the tactile sense provision apparatus 100 that makes the operational sound of the actuator 15 less audible to the user who operates the information processing apparatus 300 while viewing the touch panel 376 and that facilitates the user to concentrate on the operation of the information processing apparatus 300.

The internal actuator 10 is not limited to the structure described with reference to FIGS. 8 to 13. Any internal actuator 10 may be used in which the first mover 40 is configured to instantly move relative to the first stator 20.

The tactile sense provision apparatus 100 may include one, or three or more actuators 15. For example, if the tactile sense provision apparatus 100 is for use in a relatively small-sized information processing apparatus 300, for example, a smartphone, the transparent plate 110 may be vibrated by a single actuator 15.

The tactile sense provision apparatus 100 may apply pulse voltage to multiple actuators 15 at different timings. By controlling the timings, the amplitude of the vibration can be changed depending on the position of the transparent plate 110. This enables different tactile feedback for the respective fingers if a combined use with a multi-touch information processing apparatus 300 is employed, for example.

Embodiment 2

The present embodiment relates to a tactile sense provision apparatus 100 that is easily attachable to and detachable from the information processing apparatus 300. The components common to those in Embodiment 1 will not be described here.

Figure 24:
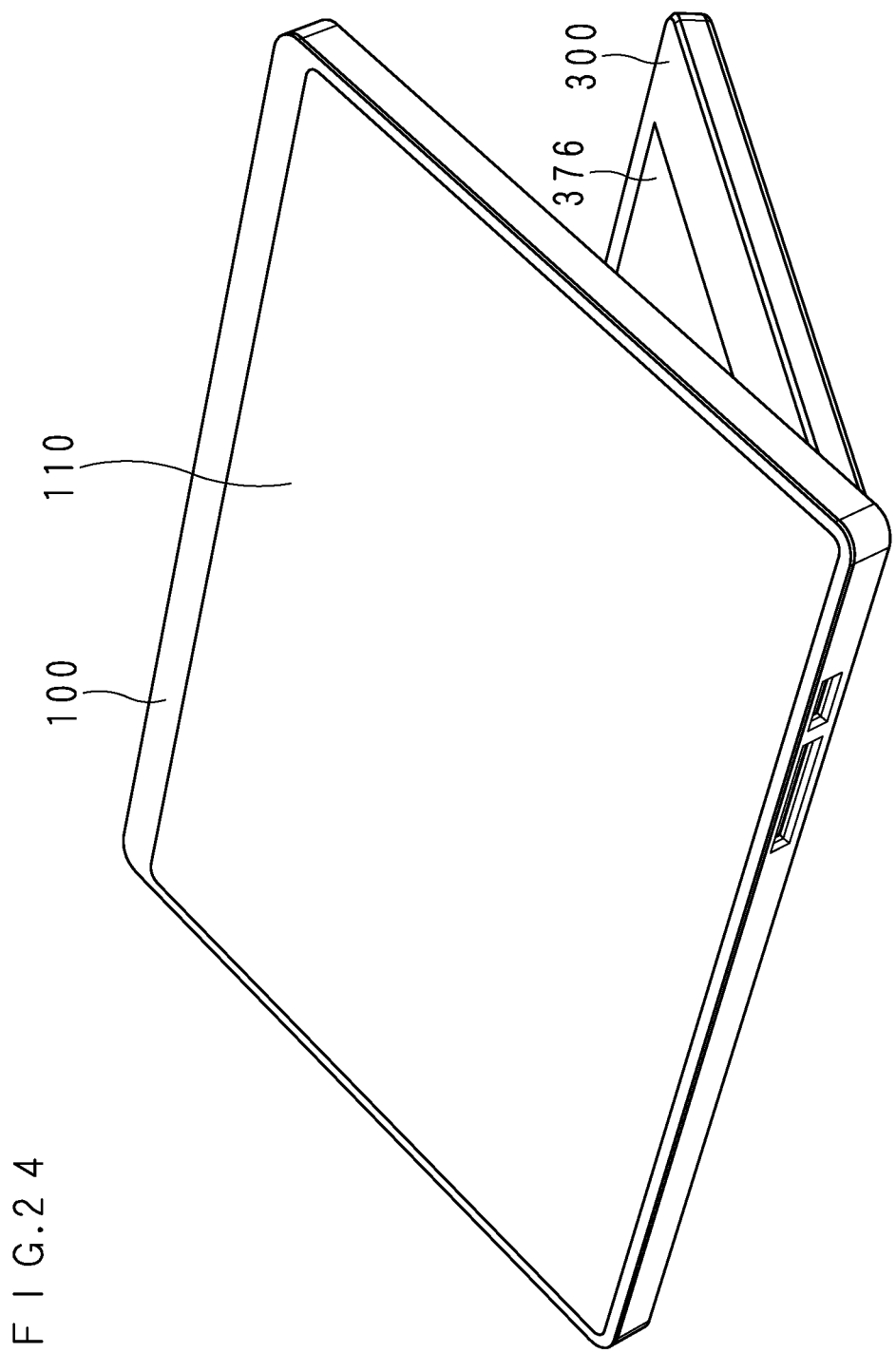
FIG. 24 illustrates an installation method of a tactile sense provision apparatus in Embodiment 2.

FIG. 24 illustrates an installation method of the tactile sense provision apparatus 100 in Embodiment 2. The casing part 130 of the tactile sense provision apparatus 100 according to the present embodiment does not have the bottom plate 131 of the information processing apparatus accommodation part. Thus, the tactile sense provision apparatus 100 is usable by merely being put on the information processing apparatus 300 as illustrated in FIG. 24.

According to the present embodiment, it is possible to provide the tactile sense provision apparatus 100 that is easily attachable to and detachable from the information processing apparatus 300. The tactile sense provision apparatus 100 according to the present embodiment is suited for applications of the user not carrying the information processing apparatus 300, such as a case where the information processing apparatus 300 is used by being carried by a receptionist robot or by being hung on a wall.

Embodiment 3

The present embodiment relates to a tactile sense provision apparatus 100 attached to a stationary information processing apparatus 300. The components common to those in Embodiment 1 will not be described here.

Figure 25:
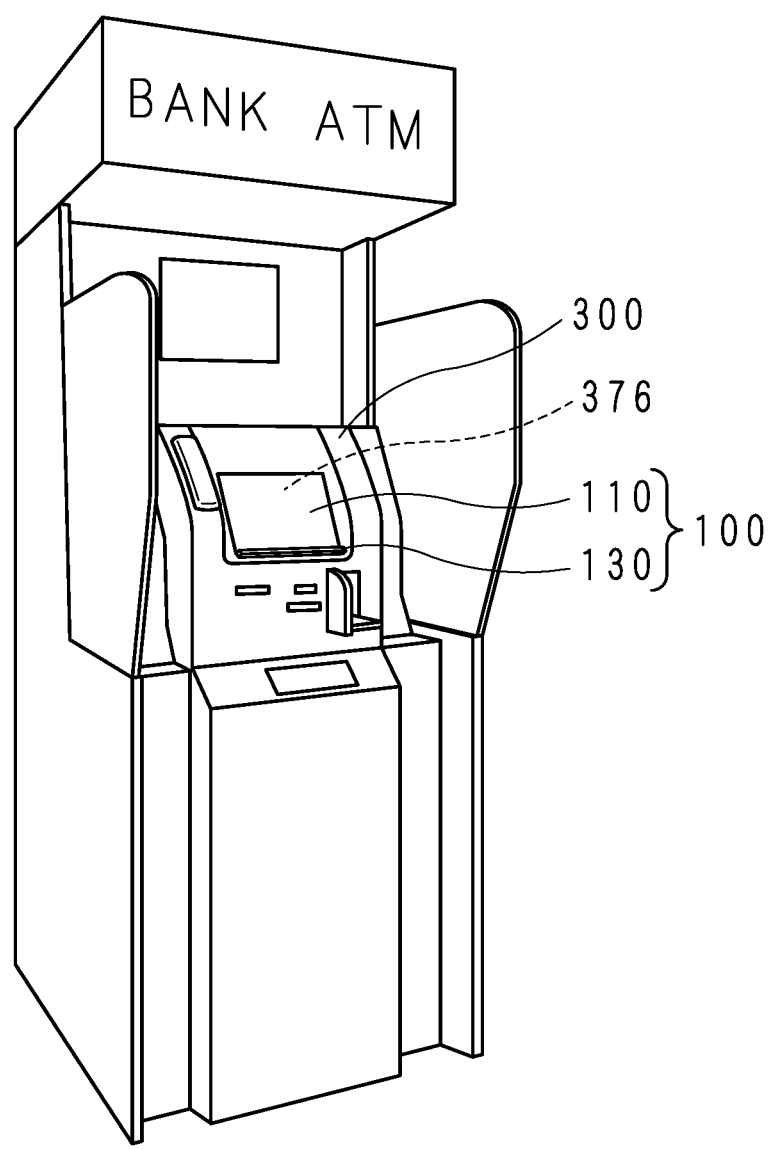
FIG. 25 illustrates a tactile sense provision apparatus in Embodiment 3 in use.

FIG. 25 illustrates a tactile sense provision apparatus 100 in Embodiment 3 in use. The information processing apparatus 300 according to the present embodiment is a stationary device that is used by a large number of unspecified users, such as an automatic teller machine (ATM) at a bank, a multimedia terminal at a convenience store, a ticket machine at a station or the like.

Figure 27:
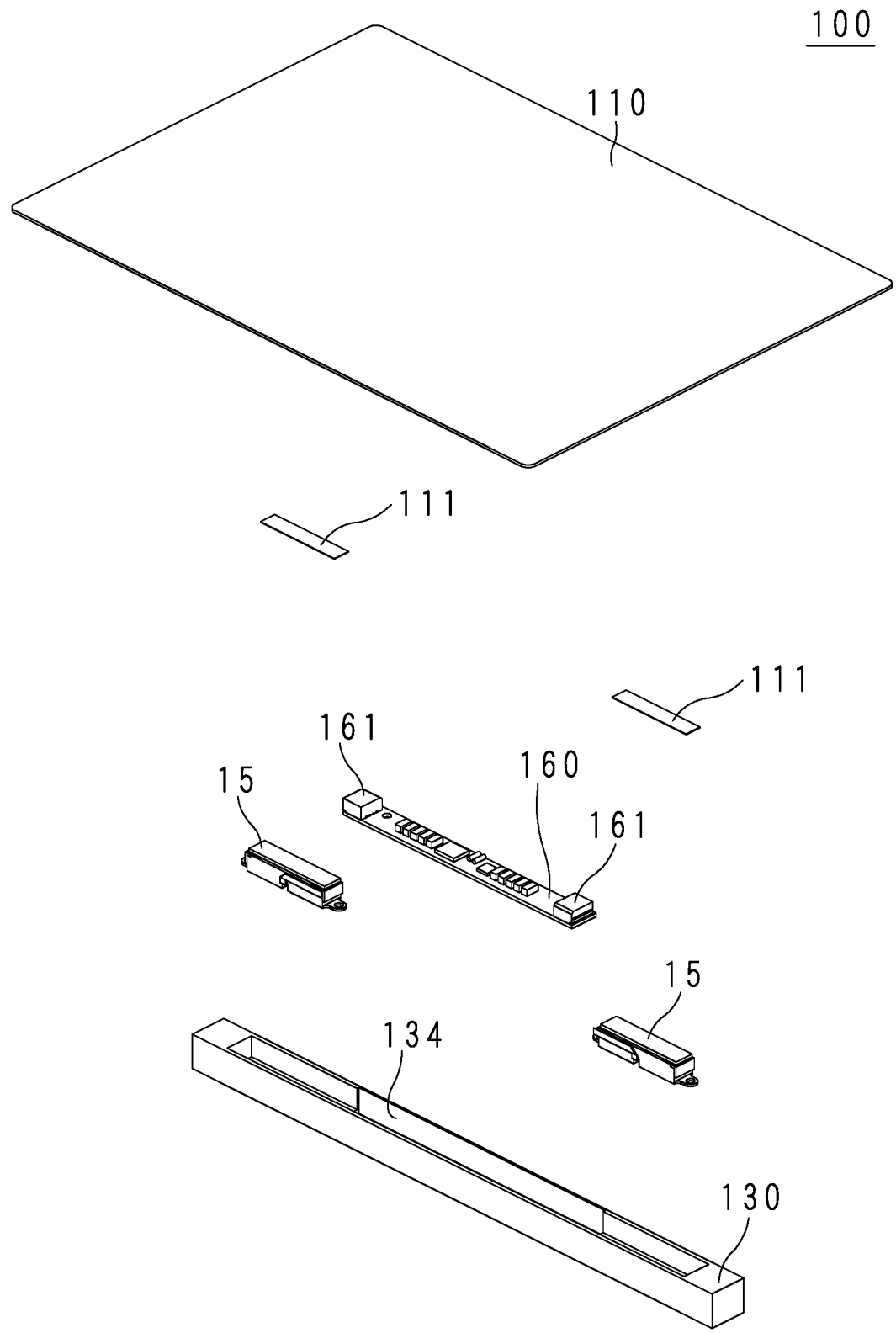
FIG. 27 is an exploded perspective view of the tactile sense provision apparatus in Embodiment 3.

FIG. 26 is a perspective view of the tactile sense provision apparatus 100 in Embodiment 3. FIG. 27 is an exploded perspective view of the tactile sense provision apparatus 100 in Embodiment 3. With reference to FIGS. 25 to 27, the tactile sense provision apparatus 100 according to the present embodiment will be described.

The tactile sense provision apparatus 100 has a transparent plate 110 and a casing part 130. The casing part 130 accommodates actuators 15 and a circuit board 160. The actuators 15 and the transparent plate 110 are fixed by a double-sided tape 111.

The tactile sense provision apparatus 100 is fixed to the information processing apparatus 300 by an adhesive agent or the like such that the top surface of the transparent plate 110 in FIG. 26 faces toward a touch panel 376 of the information processing apparatus 300. As illustrated in FIG. 25, the casing part 130 is located along the edge of the touch panel 376.

According to the present embodiment, it is possible to provide the tactile sense provision apparatus 100 that provides a tactile feedback function to a large-sized information processing apparatus 300 such as an existing ATM, or the like. Note that the tactile sense provision apparatus 100 may be attached to a home-use television, a game machine, a display for a personal computer or the like.

Any of the technical features (the constituent features) described in the respective embodiments can be combined with each other, and such a combination can form a new technical feature. It is to be understood that the embodiments disclosed here are illustrative in all respects and not restrictive. The scope of the present invention is defined by the appended claims, and all changes that fall within the meanings and the bounds of the claims, or equivalence of such meanings and bounds are intended to be embraced by the claims.

It is to be noted that, as used herein and in the appended claims, the singular forms "a", "an", and "the" include plural referents unless the context clearly dictates otherwise.

The invention claimed is:

1. A tactile sense provision apparatus comprising:
a transparent plate that covers a touch panel of equipment;
an actuator that is fixed to the transparent plate;
a reception unit that receives a signal transmitted based on operation through the touch panel; and
a control unit that operates the actuator based on a signal received by the reception unit, wherein
the actuator comprises:
an internal actuator including a first stator and a first mover opposed to the first stator, the first mover moving in a direction away from the first stator,
a second stator having a fixation wall that is disposed in a direction in which the first stator and the first mover are opposed to each other and that is disposed on a first mover side and away from the first mover, the second stator being fixed with the first stator, and
a second mover having a pressing wall to be inserted between the first mover and the fixation wall and fixed to the transparent plate.

2. The tactile sense provision apparatus according to claim 1, wherein
the first stator includes a plurality of stator convex portions,
the first mover includes a mover convex portion arranged between the stator convex portions and fixed at the transparent plate, and
a wire made of a shape memory alloy is located between the first stator and the first mover along a direction in which the stator convex portions are aligned.

3. A control method controlling the tactile sense provision apparatus according to claim 2 and causing a computer having a touch panel to execute the following steps of:
determining whether or not vibration is necessary based on operation accepted through the touch panel; and
transmitting a signal to operate the actuator in the tactile sense provision apparatus, if it is determined that vibration is necessary.

4. A control method controlling the tactile sense provision apparatus according to claim 1 and causing a computer to execute the following steps of:
determining whether or not vibration is necessary based on operation accepted through the touch panel; and
transmitting a signal to operate the actuator in the tactile sense provision apparatus, if it is determined that vibration is necessary.

\* \* \* \* \*